United States Patent
Elazari-Volcani

(10) Patent No.: US 8,801,332 B2
(45) Date of Patent: Aug. 12, 2014

(54) UNDERWATER ENERGY STORAGE SYSTEM AND POWER STATION POWERED THEREWITH

(75) Inventor: Ron Elazari-Volcani, Moshav Ein-Sarid (IL)

(73) Assignee: Arothron Ltd., Zikhron-Yaakov (IL)

( * ) Notice: Subject to any disclaimer, the term of this patent is extended or adjusted under 35 U.S.C. 154(b) by 32 days.

(21) Appl. No.: 13/577,254

(22) PCT Filed: Feb. 15, 2011

(86) PCT No.: PCT/IL2011/000157
§ 371 (c)(1),
(2), (4) Date: Aug. 5, 2012

(87) PCT Pub. No.: WO2011/099014
PCT Pub. Date: Aug. 18, 2011

(65) Prior Publication Data
US 2012/0305411 A1    Dec. 6, 2012

Related U.S. Application Data

(60) Provisional application No. 61/304,499, filed on Feb. 15, 2010.

(51) Int. Cl.
*E02D 27/38* (2006.01)

(52) U.S. Cl.
USPC .................................................... 405/210

(58) Field of Classification Search
USPC .............................. 405/210, 195.1
See application file for complete search history.

(56) References Cited

U.S. PATENT DOCUMENTS

| | | | | |
|---|---|---|---|---|
| 2,747,774 A * | 5/1956 | Breitenbach | .................. | 405/210 |
| 3,727,418 A * | 4/1973 | Glazier | ..................... | 405/210 |
| 3,791,152 A * | 2/1974 | Davis et al. | .................. | 405/210 |
| 3,803,855 A * | 4/1974 | Malkiel | ......................... | 405/210 |
| 3,824,942 A * | 7/1974 | Stafford et al. | ............... | 405/210 |
| 3,828,565 A * | 8/1974 | McCabe | ....................... | 405/210 |
| 3,835,653 A * | 9/1974 | Hix, Jr. | ......................... | 405/210 |
| 3,855,809 A * | 12/1974 | Westling | ...................... | 405/210 |

(Continued)

FOREIGN PATENT DOCUMENTS

| | | |
|---|---|---|
| EP | 0006086 | 12/1979 |
| FR | 2866096 | 8/2005 |

(Continued)

OTHER PUBLICATIONS

International Preliminary Report on Patentability Dated Aug. 30, 2012 From the International Bureau of WIPO Re. Application No. PCT/IL2011/000157.

(Continued)

*Primary Examiner* — Frederick L Lagman

(57) ABSTRACT

An underwater energy storage system includes a tank for storing a compressed gas that is adapted to be stored underwater. The tank includes at least one water opening through which water from surrounding environment can flow into and out of the tank, and at least one gas opening through which the compressed gas is received. The underwater energy storage system further includes at least one duct communicating between the at least one opening for gas flow and a source of compressed gas and a compartment constructed over a roof of the tank, wherein said compartment is adapted for receiving weights at a sinking site of the tank.

38 Claims, 25 Drawing Sheets

(56) References Cited

U.S. PATENT DOCUMENTS

| | | | | |
|---|---|---|---|---|
| 3,898,846 | A * | 8/1975 | McCabe | 405/210 |
| 3,938,343 | A * | 2/1976 | Lamy | 405/195.1 |
| 4,200,411 | A * | 4/1980 | Brown et al. | 405/210 |
| 4,209,271 | A * | 6/1980 | McCabe et al. | 405/210 |
| 4,230,422 | A * | 10/1980 | Brown et al. | 405/210 |
| 4,289,425 | A | 9/1981 | Ootsu | |
| 4,402,632 | A * | 9/1983 | Cook | 405/210 |
| 4,954,035 | A * | 9/1990 | Strebel | 405/210 |
| 6,347,910 | B1 * | 2/2002 | Morishige | 405/210 |
| 7,735,506 | B2 * | 6/2010 | Horton et al. | 405/210 |
| 7,743,609 | B1 | 6/2010 | Brostmeyer | |
| 8,186,443 | B2 * | 5/2012 | Wolinsky | 405/210 |
| 2007/0140795 | A1 * | 6/2007 | Espinasse | 405/210 |
| 2011/0013989 | A1 * | 1/2011 | Wu | 405/210 |
| 2011/0099014 | A1 | 4/2011 | Zopf | |
| 2012/0260839 | A1 * | 10/2012 | Maher et al. | 405/210 |

FOREIGN PATENT DOCUMENTS

| | | |
|---|---|---|
| GB | 1394524 | 5/1975 |
| GB | 2069618 | 8/1981 |
| JP | 54-011517 | 1/1979 |
| JP | 63-111397 | 5/1988 |
| JP | 63-239320 | 10/1988 |
| JP | 63-253123 | 10/1988 |
| JP | 63-270999 | 11/1988 |
| JP | 01-177838 | 7/1989 |
| JP | 02-271032 | 11/1990 |
| JP | 04-086332 | 3/1992 |
| JP | 04-121424 | 4/1992 |
| JP | 06-146920 | 5/1994 |
| WO | WO 2007/066117 | 6/2007 |
| WO | WO 2011/099014 | 8/2011 |

OTHER PUBLICATIONS

Communication Relating to Results of the Partial International Search Dated Aug. 30, 2011 From the International Searching Authority Re. Application No. PCT/IL2011/000157.

International Search Report and the Written Opinion Dated Jun. 4, 2012 From the International Searching Authority Re. Application No. PCT/IL2011/000157.

* cited by examiner

UNDERWATER ENERGY STORAGE SYSTEM AND POWER STATION POWERED THEREWITH

RELATED APPLICATIONS

This application is a National Phase of PCT Patent Application No. PCT/IL2011/000157 having International filing date of Feb. 15, 2011, which claims the benefit of priority under 35 USC §119(e) of U.S. Provisional Patent Application No. 61/304,499 filed on Feb. 15, 2010. The contents of the above applications are all incorporated by reference as if fully set forth herein in their entirety.

FIELD OF THE INVENTION

The present invention, in some embodiments thereof, relates to underwater energy storage and, more particularly, but not exclusively, to underwater energy storage of compressed air.

BACKGROUND OF THE INVENTION

Although renewable energy from natural resources such as sunlight, wind, rain, and tides are typically clean, plentiful and relatively cheap, its use has been limited due to an inherent problem that renewable energy is not always available on demand. Compressed air energy storage is a way to store energy generated during periods of low energy demand for use during periods of high energy demands. It has been proposed to store compressed air in a high pressure environment such as deep underwater to avoid the costs of high-pressure vessels for storing the compressed air.

A compressed air energy storage device in development stages is described in an article published on Apr. 28, 2010 on www.energystorageforum.com/tag/compressed-air/downloaded from the internet on Jan. 27, 2010. The article discloses a pumpkin-shaped, underwater, compressed-air-storage devices being trialed at the University of Nottingham. It is described that the compressed-air-storage devices, constructed from steel and polymer, are designed to be pumped full of high-pressure air during times of high winds and low demand, with the stored energy used to turn turbines to create electricity when needed on the grid. The article states that the compressed-air-storage devices being trialed at the University of Nottingham could prove key to overcoming one of the main obstacles to Europe's long-term ambitions for utility-scale renewable-energy production—that peak power-generating times from offshore wind farms rarely match peak demands for electricity onshore.

Japanese Patent Application No. JP54011517 published on Jan. 27, 1979, entitled "Marine pressurized water type energy storing method," the contents of which is incorporated by reference, describes a rigid dome shaped air storage tank including a water valve and an air pipe for storing pressure energy in a pressurized water vessel placed in or on the bottom of the sea with compressed air pumped in from an air compressor set in the marine space.

Japanese Patent Application No. JP63239320 published on Oct. 5, 1988, entitled "Underwater Energy Storage Device," the contents of which is incorporated by reference, describes a hollow rigid bottomless case placed on the bottom of the sea for storing pressurized air. During the nighttime or the like where the surplus power is produced, a compressor is operated to feed pressurized air into the hollow case through a connecting pipe, and then, by forcing the seawater through a water passage hole, the electrical energy is stored as an air-pressure energy in the case. During the daytime, a generator is operated by making use of the pressurized air stored in the case.

Japanese Patent Application No. JP2271032, published on Nov. 6, 1990, entitled "Compressed air storage device for underwater installation and submerging method thereof," the contents of which is incorporated by reference, describes an underwater installation compressed air storage device including main compressed air storage tank of bottomless shell construction and an additional weight adding part in its lower part. It is described that the device is softly landed to the sea bottom by releasing compressed air from a work deck barge and special underwater concrete is placed in the additional weight adding part through a pipe. The storage device is connected to a compressor and a turbine on the ground with a pipe.

Japanese Patent Application No. JP4121424 published on Apr. 22, 1992, entitled "Air storage power generation method and air storage power generation plant," the contents of which is incorporated by reference, describes an underwater compressed air storage tank that floats above the seabed and has an opening at the bottom through which water is introduced and expelled. Water surrounding the tanks cools the air so that the temperature is decreased, while the pressure is maintained constant. Under condition of power shortage, the cooled compressed air is feed to a boost compressor and afterwards supplied to a combustor as combustion air through an air pipeline.

SUMMARY OF THE INVENTION

According to an aspect of some embodiments of the present invention there is provided a utility-scaled underwater energy storage system and method for storing compressed air underwater. According to some embodiments of the present invention, the underwater energy storage system includes features for withstanding and/or counterbalancing forces applied on a compressed air storage tank due to differential to pressure conditions that exist over a height of the storage system when stored underwater. According to some embodiments of the present invention, the underwater energy storage system includes features for submerging and anchoring the storage system underwater. According to some embodiments of the present invention, the underwater energy storage system includes feature for cooling compressed air as it flows from a compressor to a storage tank of the underwater energy storage system. According to some embodiments of the present invention, the underwater energy storage system is an adiabatic storage system including features for storing heat produced during compression of the air and using the stored heat to heat air discharged from the underwater energy storage system.

According to aspects of some embodiments of the present invention there is provided an underwater energy storage system comprising: a tank for storing a compressed gas that is adapted to be stored underwater, the tank comprising: at least one water opening through which water from surrounding environment can flow into and out of the tank; and at least one gas opening through which the compressed gas is received; at least one duct communicating between the at least one opening for gas flow and a source of compressed gas; and a compartment constructed over a roof of the tank, wherein said compartment is adapted for receiving weights at a sinking site of the tank.

Optionally, the compartment is formed with a banister encompassing the roof of the tank.

Optionally, the banister is an integral part of walls of the tank that extends above a height of the roof.

Optionally, the compartment is partitioned with partitioning walls adapted to provide structural support for the roof of the tank.

Optionally, the tank includes sloped walls, and wherein the banister at least partially encompasses the walls of the tank.

Optionally, the compartment includes a door, wherein the door provides for releasing weights received in the compartment when opened.

Optionally, the weights include at least one of rocks, sand and gravel.

Optionally, the tank includes walls that have a thickness that increases over a height of the walls.

Optionally, the tank includes walls with structural reinforcements, wherein an amount of the reinforcement provided increases over a height of the tank.

Optionally, the tank is partitioned into a plurality of chambers, said chambers include chamber walls with gas openings that provide free gas flow between the chambers and wherein each of the chambers includes water opening through which water from surrounding environment can flow.

Optionally, a chamber wall that surrounds a chamber that directly communicates with the at least on duct through which the compressed gas is received, is provided with added reinforcements.

Optionally, the at least one duct through which the compressed gas is received branches into a plurality of ducts each of which directly communicates with one of the chambers of the tank.

Optionally, the system comprises: a plurality of tanks; and gas ducts connected between gas openings of each of the plurality of tanks, wherein the gas ducts provide free gas flow between the plurality of tanks.

Optionally, the system comprises a water duct connected the at least one water opening and extending upward therefrom, said duct adapted to provide a water opening at a height above the water opening of the tank.

Optionally, the system comprises an extension extending from a floor of the tank, the extension defining an open channel in which weights can be contained for anchoring the tank on a bed of a water body.

Optionally, the tanks includes prongs extending outward from a floor of the tank, wherein said prongs are adapted to be embedded in a bed of a water body for stabilizing the tank on the bed of the water body.

Optionally, the tank is casted with concrete.

Optionally, the tank includes inner walls that are coated with a metal layer.

Optionally, a thickness of the metal layer increases over a height of the tank.

Optionally, the tank includes outer walls that are coated with a metal layer.

Optionally, the at least one duct communicating between the at least one opening for gas flow and a source of compressed gas is lined with a plurality of ribs adapted to to cool the compressed gas as it flows from the source to the tank.

Optionally, at least a portion of the ribs are outer ribs that encompass an outer diameter of the duct and wherein the outer ribs are structured to be in line with a direction of current flow in the sinking site of the system.

Optionally, the system comprises at least one duct communicating between the at least one opening for gas flow in the tank and a pneumatic device.

Optionally, the system comprises a heat exchange unit for transferring heat generated by the source of compressed gas to gas flowing from the at least one duct communicating between the at least one opening for gas flow in the tank and a pneumatic device.

Optionally, the heat exchange unit includes a heat exchange pool formed between a damn constructed at a distance from a beach and the beach.

Optionally, the heat exchange unit includes at least one thermal energy storage element through which the at least one duct communicating between the at least one opening for gas flow and a source of compressed gas and the at least one duct communicating between the at least one opening for gas flow in the tank and a pneumatic device pass through.

Optionally, the system comprises a heat exchange unit adapted to harness cooling of gas discharged from the tank for desalinating water.

Optionally, the compressed gas is compress air.

Optionally, the compressed gas is condensed carbonic gas.

According to aspects of some embodiments of the present invention there is provided an underwater energy storage system comprising: a plurality of tanks for storing compressed air underwater, wherein each of the tanks include at least one water opening through which water from a surrounding water body can flow into and out of the tank and at least one air opening for receiving and discharging the compressed air; a first duct for communicating air flow between the at least one air opening of at least one of the plurality of tanks and a source of compressed air; and at least one second duct for communicating air flow between the at least one air opening of each tank.

Optionally, the system comprises a water duct connected to the at least one water opening of each of the plurality of tanks and extending upward therefrom, said duct adapted to provide a water opening at a height above the water opening of the tank.

Optionally, at least a portion of the plurality of tanks are partitioned into a plurality of chambers, said chambers include chamber walls with air openings that provide free air flow between the chambers and wherein each of the chambers includes water opening through which water from surrounding environment can flow.

Optionally, at least a portion of the plurality of tanks includes walls with structural reinforcements, wherein an amount of the reinforcement provided increases over a height of the tank.

Optionally, at least one an inner or outer wall of the plurality of tanks is coated with a metal layer.

Optionally, the at least one duct communicating between the at least one opening for air flow and a source of compressed air is lined with a plurality of ribs adapted to cool the compressed air as it flows from the source to the tank.

Optionally, the system comprises at least one duct communicating between the at least one opening for air flow in at least one of the plurality of tanks and a pneumatic device.

Optionally, the system comprises a heat exchange unit for transferring heat generated by the source of compressed gas to air flowing from the at least one duct communicating between the at least one opening for gas flow in at least one of the plurality of tanks and a pneumatic device.

According to aspects of some embodiments of the present invention there is provided an underwater energy storage system comprising: a bell shaped tank with a concave shaped wall for storing compressed air underwater, wherein the tank includes a water opening through which water from a surrounding water body can flow into and out of the tank and at least one air flow opening for receiving compressed air; and at least one duct extending from the at least one air flow opening and a source of compressed air.

Optionally, a shape of the tank is defined to counterbalance an increase in tensile forces along a height of the tank due to an increase in pressure drop along a height of the wall.

Optionally, a change in a diameter of the tank over the height is defined to reduce tensile forces on wall of tank as the pressure drop across the wall increases.

Optionally, the tank is shaped such that a diameter of the tank at a given height to multiplied by the given height is constant for all heights of the tank.

Optionally, the system comprises a water duct connected to the water opening and extending upward therefrom, said duct adapted to provide a water opening at a height above the water opening of the tank.

According to aspects of some embodiments of the present invention there is provided an underwater energy storage system comprising: a tank for storing compressed gas underwater, wherein the tank includes at least two stories, wherein the stories are fluidly connected through at least one opening between a ceiling of a lower story and a floor of an upper story, the opening adapted to provide free flow of compressed gas and water, wherein the lower story of the tank includes at least one water opening through which water from a surrounding water body can flow into and out of the tank and wherein the upper story of the tank includes at least one air flow opening for receiving compressed air, and wherein a diameter or an extent of the upper story of the tank is less than a diameter or an extent of the lower story of the tank; and at least one duct extending from the at least one air flow opening and a source of compressed air.

Optionally, the diameter of the upper story is defined to counterbalance larger tensile force on walls of the tank in the upper story as compared to tensile force on the walls of the tank in the lower story.

Optionally, the system comprises a plurality of tanks; and air ducts connected between air opening of each of the plurality of tanks, wherein the air ducts provide free gas flow between the plurality of tanks.

Optionally, the at least one duct extending from the at least one air flow opening and a source of compressed air is lined with a plurality of ribs adapted to cool the compressed air as it flows from the source to the tank.

Optionally, the system comprises at least one duct communicating between the at least one air flow opening in the tank and a pneumatic device.

Optionally, the system comprises a heat exchange unit for transferring heat generated by the source of compressed air to air flowing from the at least one duct communicating between the at least one air flow opening in the tank and the pneumatic device.

According to aspects of some embodiments of the present invention there is provided n underwater energy storage system comprising: a rigid tank for storing a compressed gas that is adapted to be stored underwater, the tank includes: at least one opening through which water from surrounding environment can flow into and out of the tank; and an opening through which the compressed gas is received; and at least one duct communicating between the at least one opening for gas flow and a source of compressed gas; and a collapsible bag housed in the rigid tank including an opening that communicates with the opening through which the compressed gas is received, wherein the collapsible bag is adapted to receive and contain the compressed gas.

Optionally, the gas is condensed carbonic gas.

Optionally, the system comprises a compartment constructed over a roof of the tank, wherein said compartment is adapted for receiving weights at a sinking site of the tank.

Optionally, the tank is rests on a bed of a water body.

Optionally, the bag is partially connected to a floor of the tank.

Optionally, an inner wall of the tank is coated with friction protective material.

According to aspects of some embodiments of the present invention there is provided an underwater energy storage system comprising: an underwater storage tank for storing compressed air, wherein the tank is formed from a roof construction rigidly connected to walls of an underwater geological formation, wherein said roof construction includes at least one opening though which compressed air is received; and at least one duct communicating between the at least one opening for air flow and a source of compressed air.

Optionally, the system comprises at least one duct communicating between the at least one opening for gas flow in the tank and a pneumatic device.

According to aspects of some embodiments of the present invention there is provided an underwater energy storage system comprising: a tank for storing a compressed air that is adapted to be stored underwater, wherein the tank is a floorless tank, the tank including: a collapsible portion, wherein the collapsible portion includes an opening adapted to communicate with a duct through which the compressed air is received and an open bottom from which water can enter and exit the collapsible portion; and a rigid portion adapted to provide a rigid construction for maintaining the to bottom open; and at least one duct communicating between the opening for air flow and a source of the compressed air.

Optionally, the collapsible portion is protected with a rigid cage.

Optionally, the system comprises an anchoring element attached to the rigid portion, wherein the anchoring element is adapted to maintain the tank at a given height above a bed of a water body.

According to aspects of some embodiments of the present invention there is provided an underwater energy storage system comprising: an underwater storage tank for storing compressed air, wherein the tank is formed from a rigid cover forming a cavity therein, wherein the tank includes an opening for air flow through which compressed air is received and is bottomless, and wherein the tank is adapted to float over a bed of the water body; at least one anchoring element holding the underwater storage tank for anchoring the storage tank at a height above the bed of a water body; at least one duct communicating between the opening for air flow and a source of the compressed air.

Optionally, the storage tank is dome shaped.

Optionally, the storage tank has a shape of a truncated sphere.

Optionally, the storage tank is constructed from at least one of metal, concrete and a rigid polymer.

Optionally, the at least one anchoring element is in a form of a net connected to a weight, where the net is adapted for encompassing the storage tank.

According to aspects of some embodiments of the present invention there is provided a method for casting an underwater energy storage system at a sinking site, the method comprising: providing a frame defining walls of an underwater storage tank, wherein the frame is fitted with duct for defining an opening for water flow communication between the tank and a surrounding water body, and wherein the frame is fitted with duct for defining an opening for air flow; blocking at least one of the opening for water flow communication and the opening for air flow; transporting the frame to a sinking site; and pouring casting material in the frame.

Optionally, the method comprises releasing blocking of the at least one of the opening for water flow communication and the opening for air flow so that the tank can sink.

Optionally, the method comprises controlling sinking with a chain of buoys.

According to aspects of some embodiments of the present invention there is provided a thermal energy storage element in the form of a sphere constructed from concrete or ceramic material and embedded with at least one metal rod, wherein the metal rod at least partially protrudes through the sphere.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
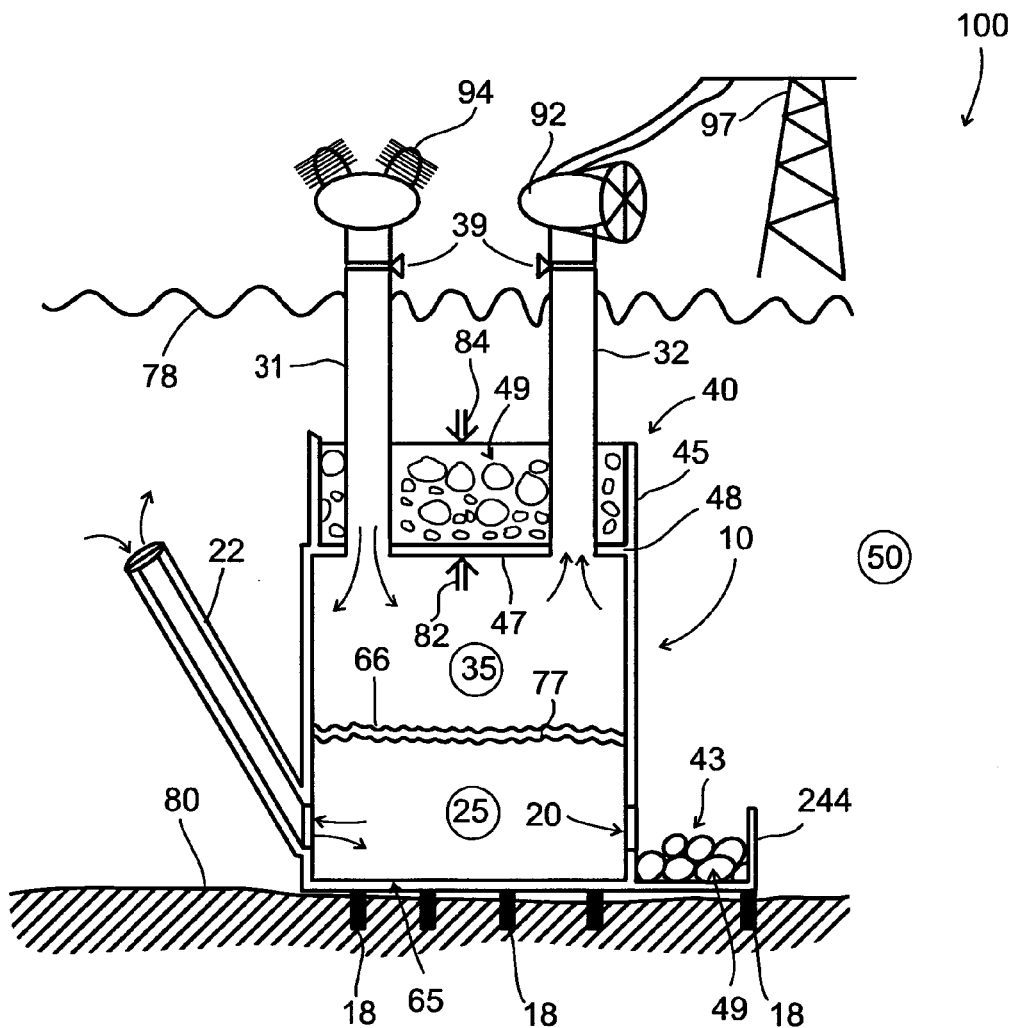
FIG. 1 is a simplified schematic drawing of an exemplary underwater energy storage system and a power station powered therewith in accordance with some embodiments of the present invention.

The present invention, in some embodiments thereof, relates to underwater energy storage and, more particularly, but not exclusively, to underwater energy storage of compressed air.

According to some embodiments of the present invention there is provided an underwater energy storage unit including a rigid storage tank equipped with a structure for receiving and containing weights over a rooftop of the storage tank that can act to counterbalance pressure differences between compressed air within the tank and pressure level of water at a height of the roof of the tank. Optionally, the structure is a banister and the weights include rocks and sand that are poured over the rooftop. In some exemplary embodiments, the structure for receiving weights includes a door for expelling the weights on demand, e.g. to float the tank above water.

The present inventors have found that significant pressure drops may exist across to an upper portion of the walls where the outside water pressure is significantly lower than an inner pressure of the tank. Optionally, the tank is designed to be wide and short to avoid large pressure differences at a height above the floor of the tank. According to some embodiments of the present invention, the tank is constructed from walls that are reinforced in a gradual manner to counterbalance the gradually changing pressure drop along a height of the tank. According to some embodiments of the present invention, the tank is shaped with a diameter that decreases over a height of the tank. Optionally, a diameter of the tank along a height of the structure is defined to counterbalances increasing tensile forces along a height of the wall due to increase in pressure drop across the walls. Optionally, the diameter of the tank steadily decreases so that the tensile forces on the walls due to pressure drop are maintained constant over the height of the tank.

According to some embodiments of the tank includes one or more openings through which water freely flows in and out of the tank. Optionally, a pipe connected to one or more openings provides a water flow opening at a height above a seabed so that water that flows into the tank does not include solid particles typically found near the seabed. Optionally the pipe provides for maintaining free water flow, even when the tank sinks into the seabed. Typically, the tank also includes one or more openings connected to pipes through which compressed air can flow into and out of the tank. Optionally and air flow pipe that directs air from a compressor to the tank includes formed with heat exchange ribs for reducing the temperature of the air before entering the underwater tank.

According to some embodiments of the present invention, the underwater tank is partitioned into a plurality of chambers that have air and optionally water flow communication between them. Optionally the partitioning provides additional reinforcements to the tank structure. Optionally, a cavity defined by the banister above the roof of the tank is also partitioned to provide reinforcement to walls and ceiling of the tank. Optionally, the chambers also have water flow communication between them. According to some embodiments of the present invention, an air flow pipe directly communicates with one or more of the compartments of a storage tank. Optionally, a single air flow pipe branches into a plurality of pipes that directly communicate with to each chamber and/or cell in a single tank.

According to some embodiments of the present invention the underwater energy storage system is constructed from a plurality of tanks, e.g. modular units that have air flow communication between them. Optionally, a single air flow pipe branches into a plurality of pipes that directly communicate with each of the modular units. The present inventors have found that by constructing underwater energy storage system from a plurality of modular units, each of the units can have a relatively smaller volume and typically a more structurally sound construction due its size. Additionally, such a system can be more cost effective since it can be composed from standardized sized units.

According to some embodiments of the present invention, the underwater storage tank is partially constructed from a flexible material. Optionally, the tank is floorless and is anchored at a height above the seabed. Optionally, the tank is partially constructed from existing geological formations, e.g. a canyon. Optionally, a rigid underwater storage tank houses a flexible bag for storing a gas and/or fluid. Optionally the rigid underwater storage tank includes water flow opening that provides free water flow in and out of that tank to counterbalance changes in a volume of the housed flexible bag.

According to some embodiments of the present invention, the underwater storage tank is constructed from a frame or mold that defines an inner cavity that is cast with cement. According to some embodiments of the present invention, the frame is transported to a sinking site and the underwater storage tank is cement casted on site. Optionally, a frame or mold defines a plurality of underwater tanks that can be in fluid communication. Optionally, one or more water flow pipes and air flow pipes are fitted onto frame prior to concrete (or cement) casting.

According to some embodiments of the present invention, the underwater energy storage system is an adiabatic system that stores heat generated during air compression and used the stored heat to expand and heat discharged air and/or is used to desalinate water. Optionally, energy is stored in heat exchange reservoirs and/or in thermal energy storage elements.

Before explaining at least one embodiment of the invention in detail, it is to be understood that the invention is not necessarily limited in its application to the details of construction and the arrangement of the components set forth in the following description and/or illustrated in the drawings. The invention is capable of other embodiments or of being practiced or carried out in various ways.

Referring now to the drawings, FIG. 1 illustrates a simplified schematic drawing of an exemplary underwater energy storage system and power station powered therewith in accordance with some embodiments of the present invention. According to some embodiments of the present invention, an underwater energy storage system 100 stored in a water body 50, e.g. a sea, lake or reservoir level and anchored on a bed 80 of the water body 50 includes a rigid tank 10, an inlet air duct 31 for receiving compressed air, an outlet air duct 33 for releasing compressed air, and one or more water ducts 22 and/or water openings 20 for receiving and expelling water to and from the underwater environment. Typically, tank 10 includes a floor 65 so that flow in and out of tank 10 is only provided through dedicated openings, e.g. openings 20, 21 for water flow and 31, 32 for air flow. Typically, tank 10 is filled with water 25 and compressed air 35.

According to some embodiments of the present invention, air compressed with a compressor 94 is pumped and/or feed through inlet pipe 31 into tank 10 for storage and released through outlet pipe 32 when an energy source is required. Typically, air is compressed during off-peaks hours, stored in tank 10 and then controllably released during peak hours when additional energy is required. Optionally, energy from waves are harnessed to compress air. In some exemplary embodiments, air released from tank 10 is used to drive a turbine 92, e.g. a wind turbine connected with electricity main 97. Optionally, wind turbine 92 directly extends from tank 10, e.g. tank 10 serves as a structural base for wind turbine 92. Typically, inlet duct (or pipe) 31 and outlet duct (or pipe) 32 are equipped with valves 39 for controlling flow through the pipes. Typically, ducts 31 and 32 are connected to openings in an upper portion of tank 10 where air is present. Optionally, ducts 2, 3 are connected to one or more openings in roof 48 of tank 10. In some exemplary embodiments, inlet and outlet flow of air is provided with a single duct connected to a single opening in tank 10. Optionally, a single inlet/outlet duct connected to storage tank 10 branches into one or more additional ducts, e.g. inlet and/or outlet ducts. Ducts 31 and 32 may be either rigid or flexible.

According to some embodiments of the present invention, water is free to flow into and out of water ducts 22 and/or water openings 20 to balance pressure level in tank 10 as air flows into and out of tank 10. Typically, compressed air 35 is stored in tank 10 at constant pressure. In some exemplary embodiments, duct or pipe 22 is connected to a lower part of tank 10 typically below the expected minimum water level and extends upwards, e.g. with a slope so that water can be collected into tank 10 from a height above bed 80 of the water body 50 where the water, e.g. sea or lake water is expected to be clean from particles such as sand and dust. Optionally, duct or pipe 22 is several meters long, e.g. 5-50 meters or 30 meters to provide unobstructed water flow even in cases when the tank sinks into bed 80 of the water body. Optionally, tank 10 includes a plurality of openings for water flow optionally connected to water flow ducts to provide sufficient water flow in and out of the tank even in cases when one or more of the openings are obstructed. Optionally openings 20 and/or ducts 22 are equipped with filters to prevent obstruction of water flow openings.

In some exemplary embodiments, an electricity producing turbine (not shown) is installed in one or more water openings 20 or openings of ducts 22 and is used to generate electricity during periods of air discharge when water flow is rushed into tank 10. In some exemplary embodiments, oil 66 is provided in tank 10 to cover water surface 77 and thereby prevent evaporation of water in tank 10. Optionally, floating structures, e.g. Styrofoam™ is added to cover water surface 77 and thereby prevent evaporation of water in tank 10. Alternatively, water 77 is not covered with a material to prevent evaporation.

Typically, air pressure in tank 10 is maintained at a pressure level defined by a depth of water 25 in tank 10 and depth under water level 78 in which tank 10 is submerged. Since the air pressure in the structure is typically close to or the same as the external water pressure, storing tank 10 in deeper water, increases the pressure of air 35 and thereby the amount of air and energy that it can store.

According to some embodiments of the present invention, underwater energy storage system 100 includes a compartment 40 over ceiling 47 of tank 10 for storing weights and/or fillers 49. In some exemplary embodiments, weights 49 are composed from sand, rocks gravel and/or recycled wastes that are poured into and/or positioned in compartment 40 during and/or after submersion of tank 10 underwater. Optionally weights 49 is cement poured into compartment 40. In some exemplary embodiments, compartment 40 is defined by a banister 45 that surrounds roof 48 and/or tank 10. Optionally, underwater energy storage system 100 includes a frame 244 that extends from tank 10, e.g. from floor 17 and forms a cavity 43 for receiving weights 49. According to some embodiments of the present invention, floor 17, frame and/or banister 244 are integral parts of tank 10, e.g. a single unit with tank 10. According to some embodiments of the present invention, weights 49 provide a gravitation force 84 on tank 10 for resisting floatation of the tank. In some exemplary embodiments, compartment 40 is sized and designed to contain a volume and mass of weights 49 that can provide a gravitational force that counterbalances pressure drop across roof 48 generating an upward force 82. This feature is explained in more detail herein below.

Optionally, floor 65 includes prongs and/or extensions 18 that are designed to be buried in seabed 80 and thereby stabilize tank 10 on the seabed. Optionally prongs 18 are an integral part of tank 10 and are constructed from cement. Alternatively, prongs 18 are constructed from metal extending out from flow 65.

According to some embodiments of the present invention, tank 10 is constructed from one or more of concrete, cement, metal and plastic. Typically, tank 10 is constructed as a single unit for durability. Optionally, tank 10 is constructed from cement with fibers mixed into the cement that may increase durability of tank 10 and prevent cracking. Optionally fibers from one or more of polymer material, glass and metal is mixed into the cement. The present inventor has found that the types of forces and directions of forces applied on the tank can vary greatly due to changing conditions in and around the tank. Changes in conditions may be due for example to changes in the volume of water and/or air in the tank, to changes in temperature drop across the walls of the tank and/or due to changes in water currents. According to some embodiments of the present invention, tank 10 is constructed from a composite of different types of materials to provide durability against varying forces, e.g. tensile and compressive forces that may be applied on tank 10 over time. In some exemplary embodiments, tank 10 is constructed from reinforced concrete, e.g. concrete reinforced with metal to provide durability against both tensile and compressive forces, e.g. metal for providing durability against tensile forces and concrete for providing durability against compressive forces. In some exemplary embodiments, tank 10 is coated inside and/or outside with metal, alloys, polymers or oils. Optionally, metal coating is used to prevent leakage of air through cement and to facilitate damage repairs by patching or welding. Optionally, to tank 10 is constructed with reinforced concrete that includes a metal and/or polymer layer on at least one of the inside and outside walls. Optionally corrosion and/or cathodic inhibitors are used to retard corrosion. Optionally, tank 10 may be cylindrical in shape and have a diameter between 20-200 meters and/or between 30-120 meters with a height of between 5-20 meters and/or 5-12 meters. In some exemplary embodiments, compartment 40 has banister 45 with a height that is between 40-100 percent, e.g. 60 percent of a height of tank 10.

In some exemplary embodiments, tank 10 may be fully or partially built on land, transported by sea to the desired location and sunk. In some exemplary embodiments, concrete is poured above or under sea level in a shell that defines structure of tank 10. According to some embodiments of the present invention, rocks or the like is piled over tank 10 to prevent its floating when air is being compressed into it.

Figure 2:
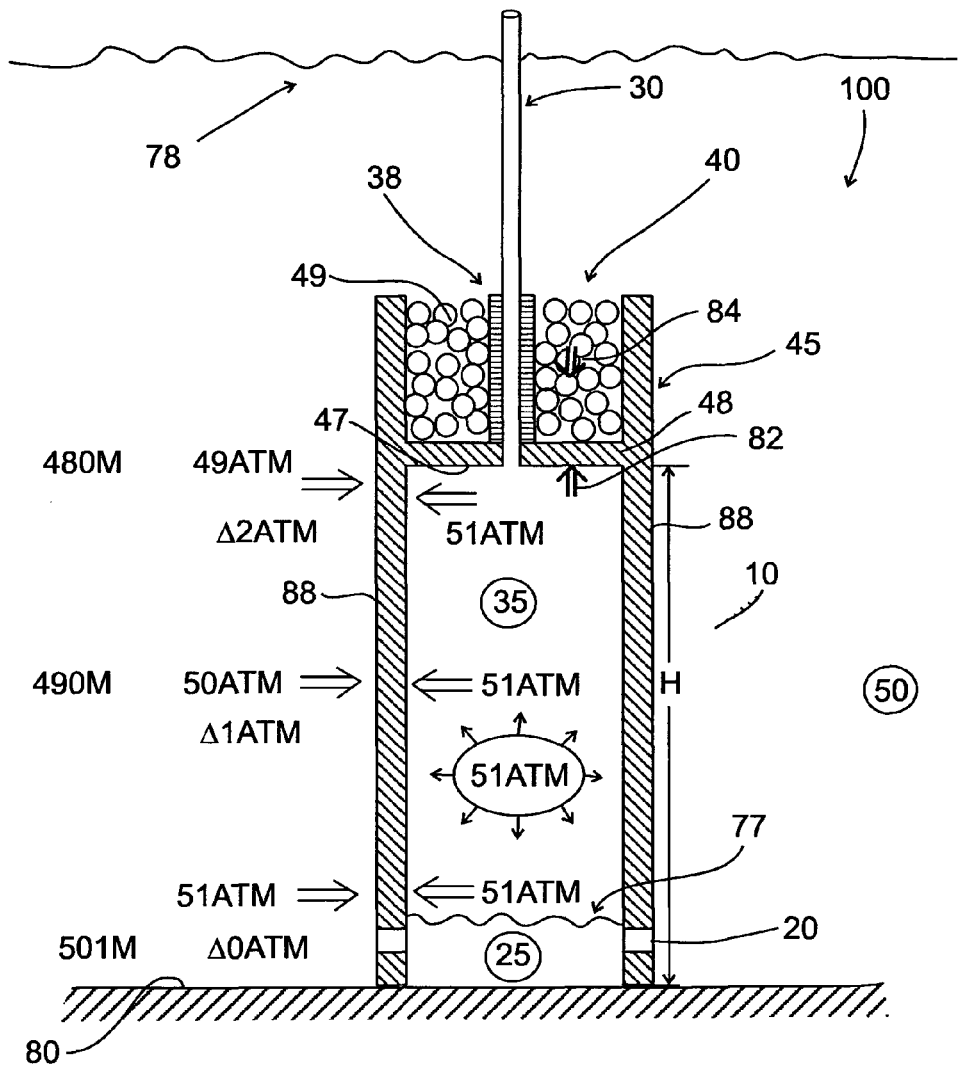
FIG. 2 is a simplified schematic diagram showing exemplary forces acting on an underwater storage tank due to differential pressure along a height of the underwater storage tank in accordance with some embodiments of the present invention.

Reference is now made to FIG. 2 illustrates a simplified schematic diagram showing exemplary forces acting on an underwater storage tank due to differential pressure along a height of the underwater storage tank in accordance with some embodiments of the present invention. While water pressure in water body 50 such as a sea, ocean and/or lake varies with depth of the water the air pressure in a tank 10 is typically constant at any one time and is defined by a difference between the height of water surface 78 of water body 50 and a height of water surface 77 contained in tank 10. Typically, the pressure drop across wall 88 increases over height 'H' due to the varying pressure conditions outside tank 10. Typically, the greatest pressure drop occurs over highest portion of the walls, e.g. near roof 48 and across roof 48 of tank 10. The present inventors have found that for utility sized tanks 10, e.g. tanks, the tensile forces due to the pressure drops may be significant and may potentially lead to bursting and/or cracking of tank 10.

In the exemplary embodiment shown in FIG. 2, tank 10 has a height of 20 meters (vertical height) and is anchored to a seabed 80 that is 501 meters below sea level 78. When a water level 77 in tank 10 is low, tank 10 is almost full with compressed air and the air pressure inside the structure is determined from a difference in depth of water in tank 10, e.g. water level 77 and depth of water the seabed (or lakebed), e.g. water level 78. In this particular example, a water level 77 in tank 10 is at a height of 1 meter above sea level 80, e.g. a depth of 500 meters from sea level 78 so that the air pressure in tank 10 is 51 ATM. The air pressure of 51 ATM is applied uniformly inside tank 10, e.g. on walls 88 and ceiling 47 of tank 10 while the water pressure outside of tank 10 changes over height H of tank 10 causing a pressure drop across walls 88 and ceiling 47 (or roof 48) of tank 10. For example, at a depth of 490 meters, water pressure outside of tank 10 is 50 ATM and the pressure drop is 1 ATM. At a depth of 480 meters, water pressure outside tank 10 is 49 ATM and the pressure drop is 2 ATM.

The present inventors have found that outward force 82 applied on ceiling 47 (of roof) of tank 10 can be particularly large because force 82 is a summation of upward pressure 82 applied to ceiling 47 due to pressure drop and also due to buoyancy and/or flotation forces of tank 10. According to some embodiments of the present invention, compartment 40, e.g. an open compartment formed by roof 48 and banister 45 filled with material 49, e.g. rocks, gravel and/or sand is adapted to apply a gravitational force 84 to counterbalance upward force 82. Typically, weight of filling 40 is defined to match expected upward force 82. The present inventors have found using weights to counter balance forces simplifies construction of tank 10 and provides for adjusting counterbalancing forces on site based on environmental conditions, e.g. depth that tank 10 is stored. In addition, weights such as sand and rocks are easily attainable and typically inexpensive.

According to some embodiments of the present invention, compartment 40 and/or banister 45 includes a door 60 that can be controllably opened to release the weights 49 on demand. Optionally, the door 60 is opened and weights 49 are released from compartment 40 in cases when it is desired to raise tank 10. In some exemplary embodiments, tank 10 is raised for repair and/or for transporting tank 10 to an alternate site, e.g. having a seabed at a different depth. Optionally, door 60 includes a latch or other mechanism that is controlled from above the water level 78. In some exemplary embodiments, inlet/outlet duct 30 extends from ceiling 47 of tank 10 and is surrounded by a shield 38 for protection against possible damage when pouring the weights over roof 48. Optionally inlet/outlet duct is a flexible pipe.

Figure 3A:
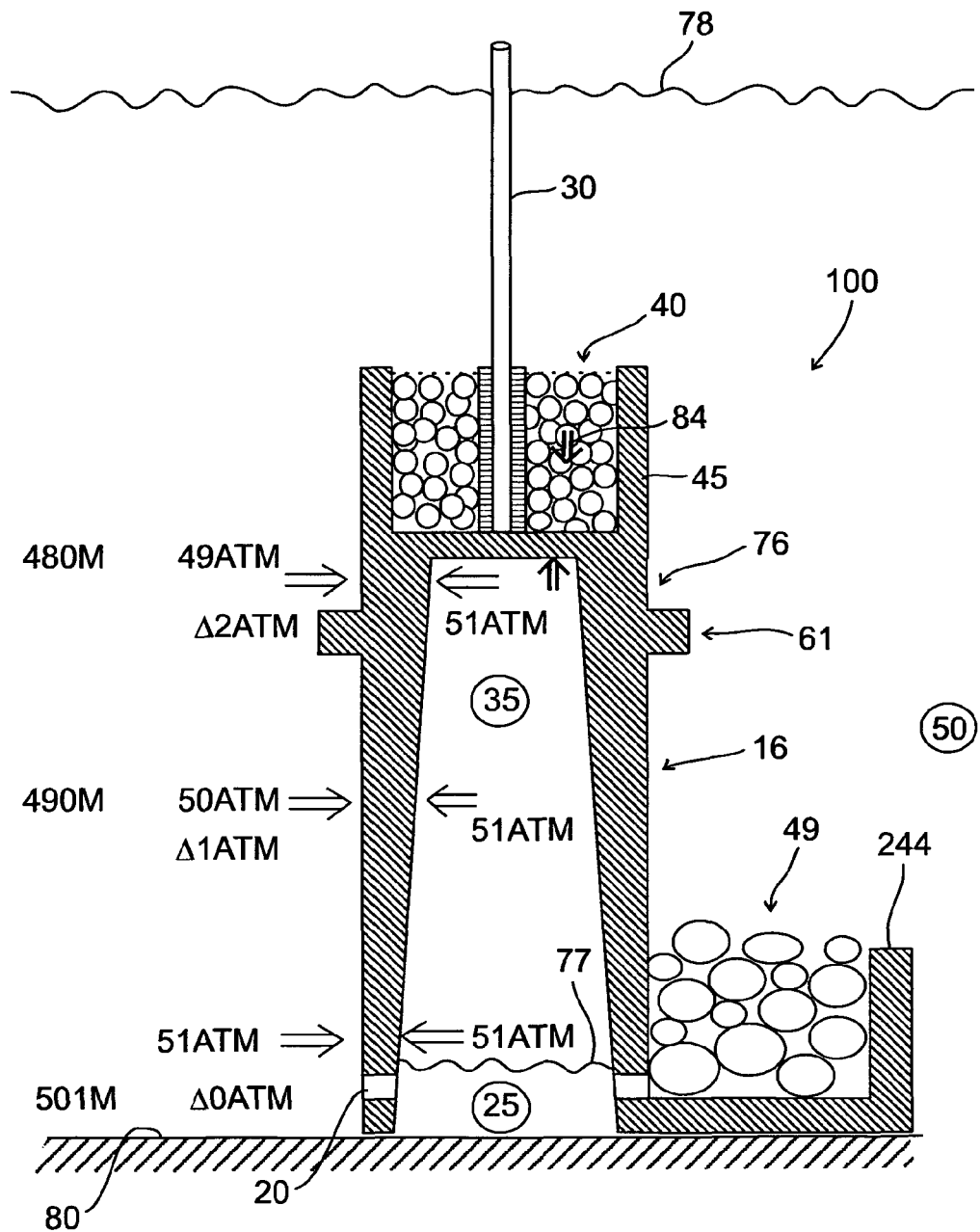
FIGS. 3A and 3B are simplified schematic drawing of exemplary underwater energy storage systems with reinforced construction for withstanding pressure drops to across walls of the storage tank in accordance with some embodiments of the present invention.
Figure 3B:
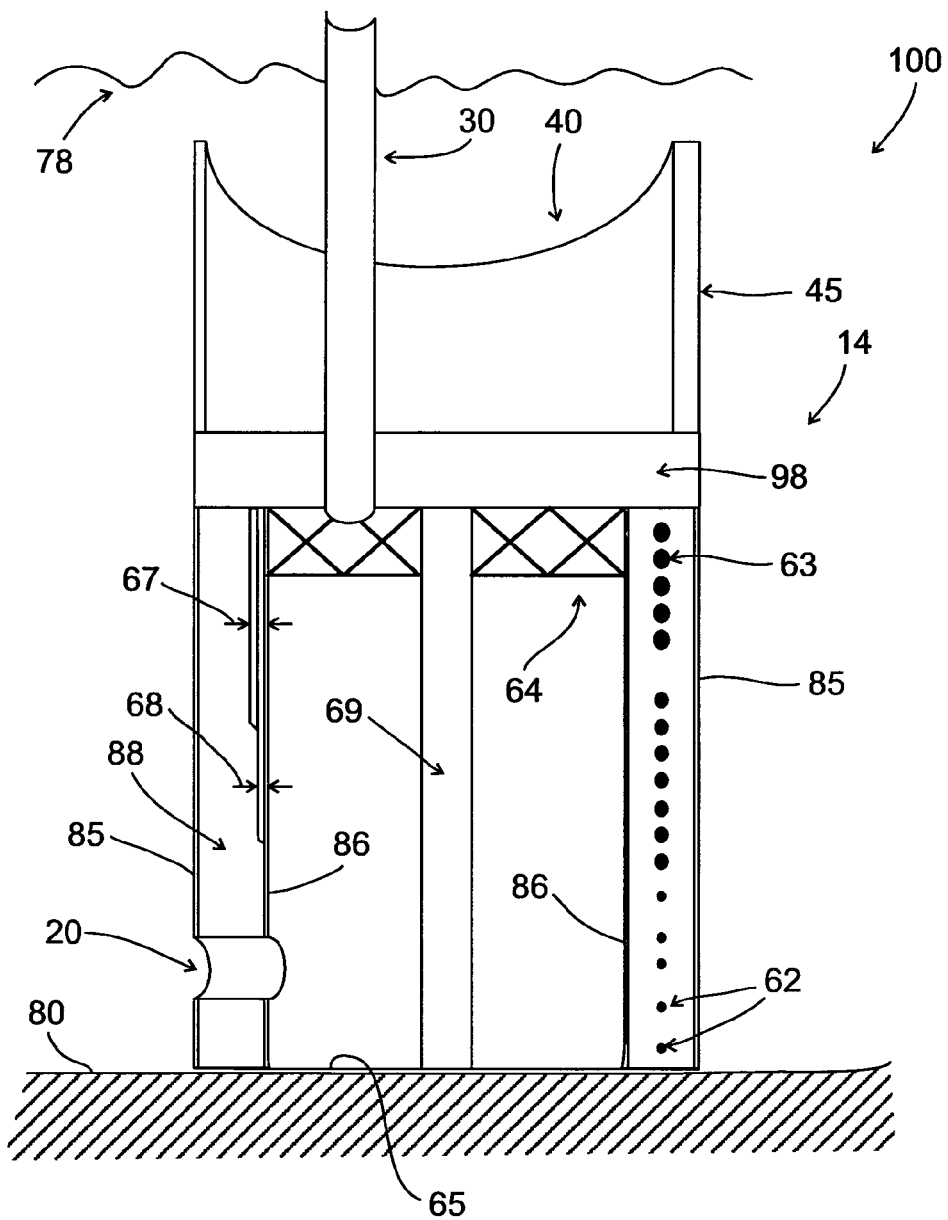

Reference is now made to FIGS. 3A and 3B illustrating simplified schematic drawing of exemplary underwater energy storage systems with reinforced construction for withstanding pressure drops across walls of the storage tank in accordance with some embodiments of the present invention. According to some embodiments of the present invention, walls of tank 10 are reinforced to withstand pressure across walls 88 due to inherently higher pressure in the upper portion of tank 10 (with respect to the vertical direction) as compared to the water pressure outside tank 10 at that level. According to some embodiments of the present invention, the reinforcements are designed to steadily increase with height of walls 88 so that stronger reinforcement is provided in upper portions of walls 88 (with respect to vertical) where the pressure drops across walls 88 is larger.

Referring now to FIG. 3A, tank 10 is built with walls 88 having a thickness that steadily increases with height so that the wall thickness is thickest at a height where the pressure drop across the walls is the largest and thinner where the pressure drop across the walls is smaller. Widening (or thickening) of the walls at upper portions of tank 10 may also provide additional support for ceiling 21. Optionally, tank 10 additionally includes an external reinforcing belt 61 surrounding tank 10 to reinforce the wall from the outside against blasting outwardly.

Referring now to FIG. 3B, in some exemplary embodiments, the walls of tank 10 are cast with reinforced concrete and the reinforcements provided are steadily increased with height of the walls, e.g. by steadily increasing the diameter and/or the proximity of reinforcement bars added to the concrete or other casting material. In some exemplary embodiments, reinforcement bars 62 used in lower portion of walls 88 are smaller in diameter as compared to reinforcement bars 63 having larger diameter. Optionally, reinforcement bars 62 in lower portion of tank 10 are more sparsely distributed as compared to reinforcement bars, e.g. bars 62 or 64 in an upper portion of tank 10. Optionally, the proximity between bars is increased gradually over height of tank 10. In some exemplary embodiments, this gradual increase in wall strength provides for withstanding gradually increasing forces due to increase pressure drops across the wall along the height of the tank.

Optionally, tank 10 additionally includes internal walls 86 plated or coated with a material other than the inner wall material, e.g. constructed from metal. In some exemplary embodiments, a thickness of internal walls is gradually increased (or in a step wise fashion) over a height of tank 10 so that it provides increases reinforcement with height to counterbalance the increased pressure drop across the walls over the height of tank 10. Optionally, thickness 67 of internal wall 86 in upper portion of internal wall 86 to is larger than thickness 68 in a lower portion of internal wall 86. Optionally, the thickness of the internal walls increased by gradually increasing the number of layers making up the inner wall and/or may be increased by increasing the thickness of the layer. Typically, internal wall 86 with varying thickness provides a smooth internal surface.

It is noted that although it is possible to construct the wall with uniform strength, for utility sized underwater energy storage systems, the gradual reinforcements described herein may provide for significantly reducing the bill of materials.

Optionally, ceiling 47 is further reinforced by adding one or more pillars 69 extending from a floor 65 of tank 10 to ceiling 47. Optionally, further reinforcements may be in the form of a metal construction 64 extending between the walls 88 and at least partially supported by walls 88.

Figure 4A:
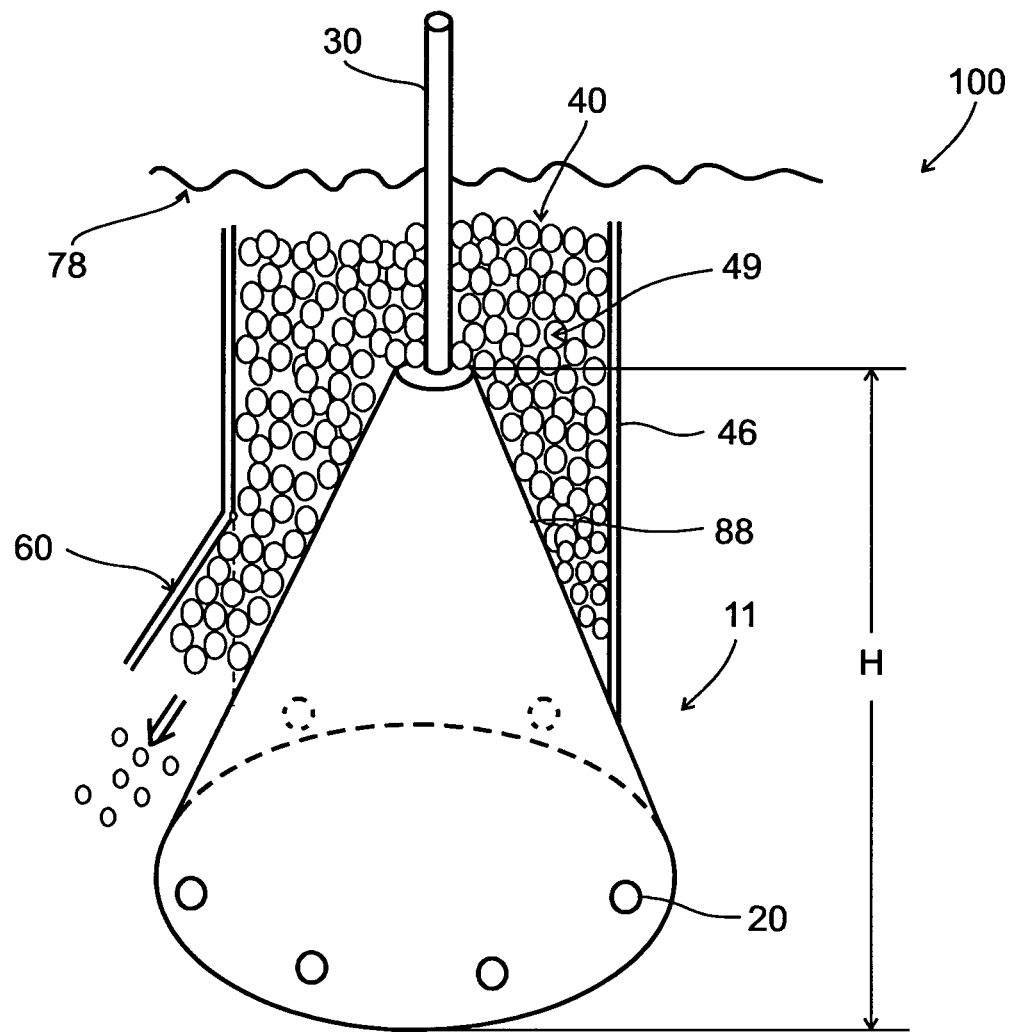
FIGS. 4A, 4B and 4C are simplified schematic drawings of exemplary underwater energy storage systems including a storage tank whose diameter decreases as a function of tank height in accordance with some embodiments of the present invention.
Figure 4B:
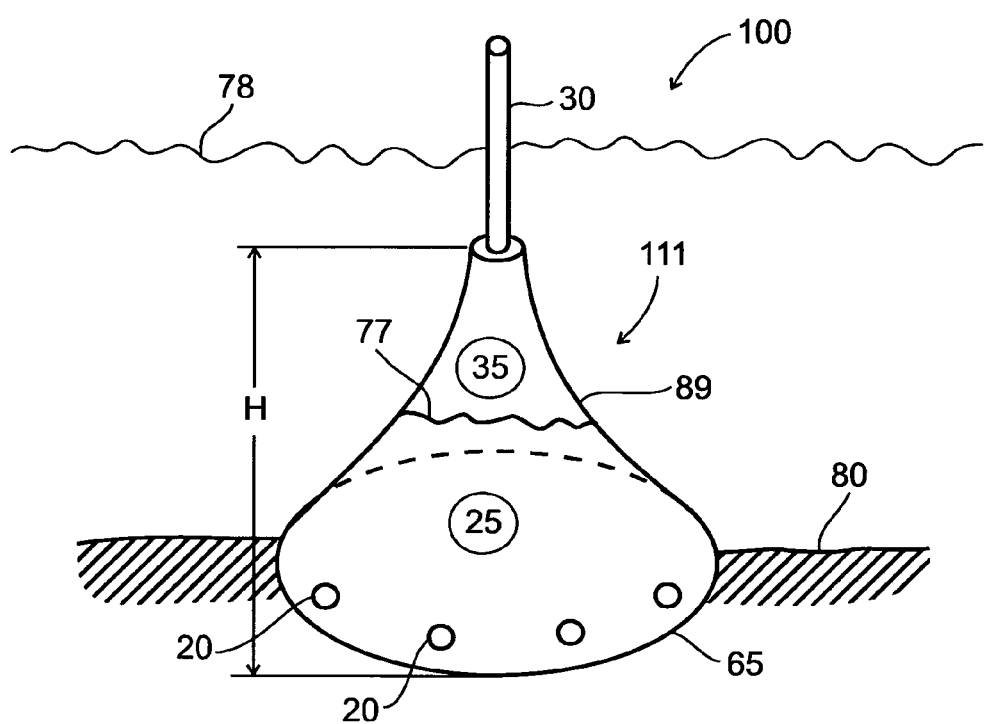
Figure 4C:
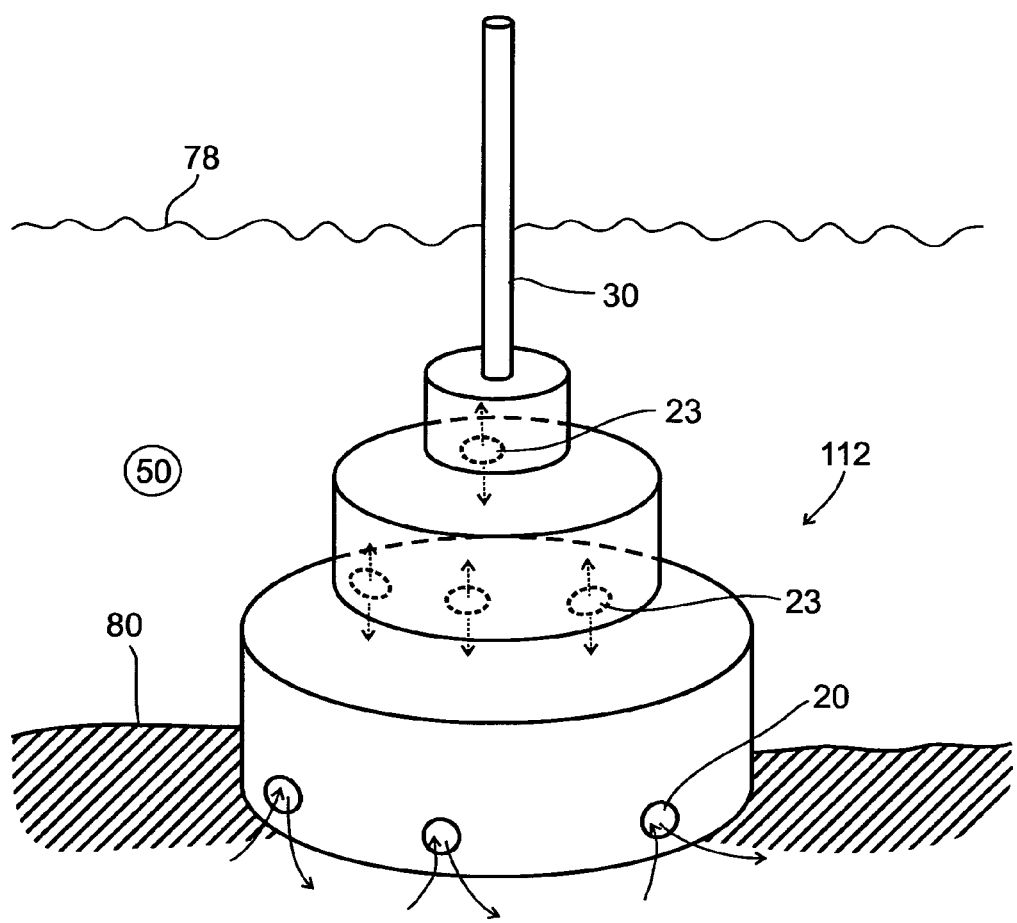

Reference is now made to FIGS. 4A, 4B and 4C illustrating simplified schematic drawings of exemplary underwater energy storage systems including a storage tank whose diameter decreases as a function of tank height in accordance with some embodiments of the present invention. According to some embodiments of the present invention, a tank 11 is substantially cone shape and/or includes walls that taper over the height 'H' of tank 11.

Referring now to FIG. 4A, optionally, weights 49 are poured over tank 11 and are used to counter balance forces due to pressure drops and buoyancy in the ceiling as well as on the walls. In some exemplary embodiments, underwater energy storage system 100 includes a banister or wall 46 around walls of tank 11 providing a compartment in which weights 49 are stored. Optionally, tank 11 is dome shaped. Optionally banister 46 surrounds walls of tank 10 at a height above bottom of tank 11 and above one or more water openings 20. According to some embodiments of the present invention, banister 49 includes one or more doors 60 that can be opened on demand to release weights 49. Optionally, doors 60 are manipulated with a cable 51 from above the water. Optionally, the weights are added during or after submerging and are removed when it is desired to float the tank to surface.

According to some embodiments of the present invention, the gravitation force exerted on the walls by weights 49 at least partially counterbalances outward forces, e.g. tensile forces exerted on the walls and ceiling of tank 11 due to a pressure drop across to the walls 88 and ceiling 47. According to some embodiments of the present invention, tank 11 is shaped with a changing slope, e.g. dome shaped so that the counterbalancing force provided by the weights has increasing force component in a direction perpendicular to walls for higher levels of walls 88 where the pressure drop is greater.

Referring now to FIG. 4B, in some exemplary embodiments, underwater energy storage system 100 includes a cone shaped (or bell shaped) underwater compressed gas storage tank 111 with concave shaped walls 89. In some exemplary embodiments, tank 111 is shaped so that a diameter of cone shaped tank 111 at a given height multiplied by at a height above the floor 65 at that given height is a constant. For example for a tank 111 that has a height 'H' of 10 meters, at a height of 1 meter above floor 65, the diameter of the tank may be 100 meters, at a height of 2 meters above floor 65 the diameter of the tank may be 50 meters, at a height of 5 meters the diameter of the tank will be 20 meters and at a height of 10 meters the diameter of the tank may be 10 meters wide. The present inventors have found that altering the diameter in this manner, a force, e.g. tensile force applied on walls 89 along the height 'H' of tank 111 due to pressure drop can be maintained constant although the pressure drop across the walls increases with height of tank 111.

Referring now to FIG. 4C, in some exemplary embodiments, the diameter of an underwater compressed gas storage tank 112 is decreased in a stepwise fashion at defined heights of tank 112. In some exemplary embodiments, tank 112 is constructed from a plurality of stories that are fluidly connected through openings 23 between the stories. Typically, each story above a first story has a smaller diameter than the story under it. In some exemplary embodiments, each story is cylindrical in shape and is associated with a constant diameter. Optionally, one or more of the stories of tank 112 includes walls that taper over a height of the story. Typically, compressed air is received from the uppermost story via air duct 30 and water openings 20 are provided on the lowest story.

Figure 5A:
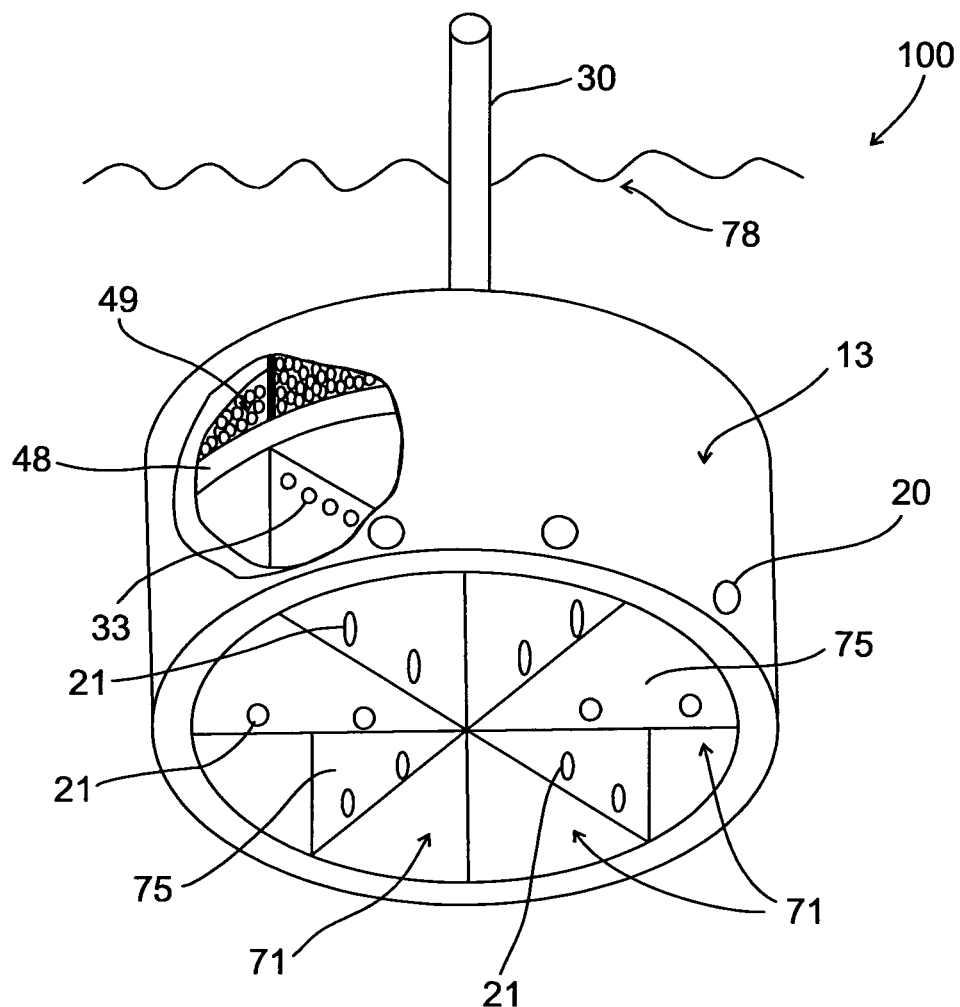
FIGS. 5A and 5B are simplified schematic drawings of exemplary underwater energy storage systems including a cylindrical storage tank that is partitioned in accordance with some embodiments of the present invention.
Figure 5B:
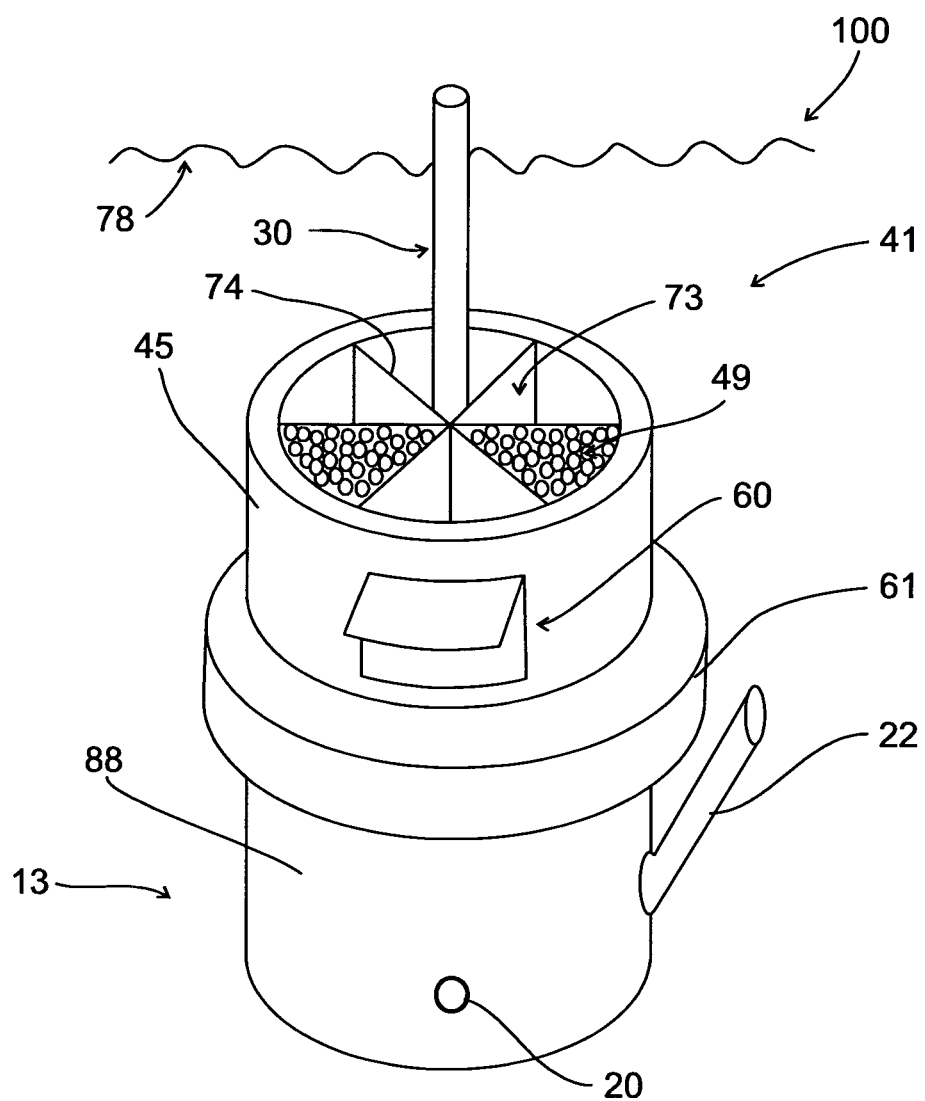

Reference is now made to FIGS. 5A and 5B illustrating simplified schematic drawings of exemplary underwater energy storage systems including a cylindrical storage tank that is partitioned in accordance with some embodiments of the present invention. According to some embodiments of the present invention, underwater energy storage unit 100 includes a cylindrical shaped tank 13 for storing compressed air including partitioning for reinforcing tank 13 against forces applied on it. According to some embodiments of the present invention, tank 13 includes partitions that form chambers 71, e.g. sector shaped chambers. In some exemplary embodiments, inlet/outlet air duct 30 extends from one or more of chambers 71. Optionally, air duct 30 is centered over tank 13 and is open to each of chambers 71. In some embodiments of the present invention, chambers 71 include air openings 33 in upper portion of each chamber that provides for air flow between inlet/outlet air duct 30 and each of chambers 44. In some exemplary embodiments of the present invention, chambers 71 additionally include water openings 21 in a bottom portion of each chamber 71 to allow free water flow between chambers 71. Typically, one or more of chambers 71 include water openings 20 providing water flow between tank 13 and water body 50.

Referring now to FIG. 5B, in some exemplary embodiments, underwater energy storage system 100 includes a compartment 41 for storing and/or receiving weights 49 above a compressed air tank 13 that is constructed from walls 88 of tank 13 that are extended above ceiling of tank 13. According to some embodiments of the present invention, compartment 41 includes partitioning walls that extend between walls 88 that divide compartment 41 into sectors shaped compartments 73. In some exemplary embodiments, partitioning walls 74 provide addition reinforcements to walls and ceiling for tank 13 against forces acting on tank 13. Optionally, partitioning walls 74, tank walls 88 and ceiling of tank 13 are constructed as a single unit, e.g. formed from a single construction for added durability. In some exemplary embodiments, partitioning 74 reinforces ceiling of tank 13 against breaking outwardly due to the pressure drop across ceiling.

According to some embodiments of the present invention, compartment 41 includes one or more openings and/or doors 60 that can be opened on demand to release weights 49. Optionally, a floor of compartment 41 is slanted down toward door 60 such that the weights fall out of the compartment due to gravitational pull. Optionally, tank 13 includes reinforcing belt 61 around upper portion of tank 13 for additional support of the walls 88.

Figure 6:
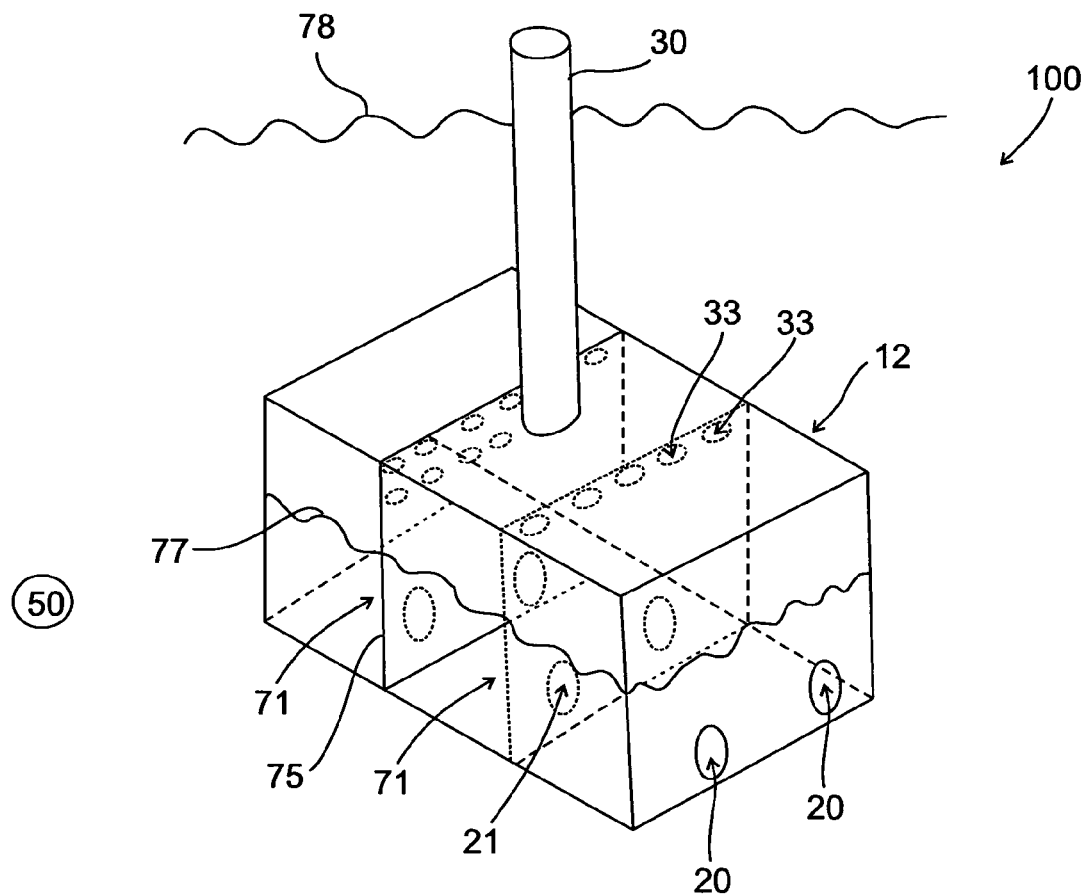
FIG. 6 is a simplified schematic drawing of exemplary underwater energy storage system including a cuboid shaped storage tank that is partitioned in accordance with some embodiments of the present invention.

Reference is now made to FIG. 6 illustrating a simplified schematic drawing of exemplary underwater energy storage system including a cuboid storage tank that is partitioned in accordance with some embodiments of the present invention. According to some embodiments of the present invention an underwater energy storage energy system 100, includes a tank 12 that is cuboid shaped and includes partitioning walls 75 that divide the inner volume into smaller compartments 71, e.g. cuboid shaped compartments. Typically partitioning walls 75 provide additional support to a ceiling and walls of tank 12. According to some embodiments of the present invention, partitioning walls 75 include opening 33 for free flow of air between compartments 71 and openings 21 for free flow of water between compartments 71.

Optionally, one or more air ducts 30 are connected through openings in one or only compartments 71 and air flow to and from duct 30 flows through other compartments through openings 33. Typically, tank 12 includes openings 20 for free water flow in and out of tank 12. Optionally, each compartment 71 has dedicated openings 20 providing water flow communication between tank and water body 50 and there is no water flow between compartments 71.

Figure 7A:
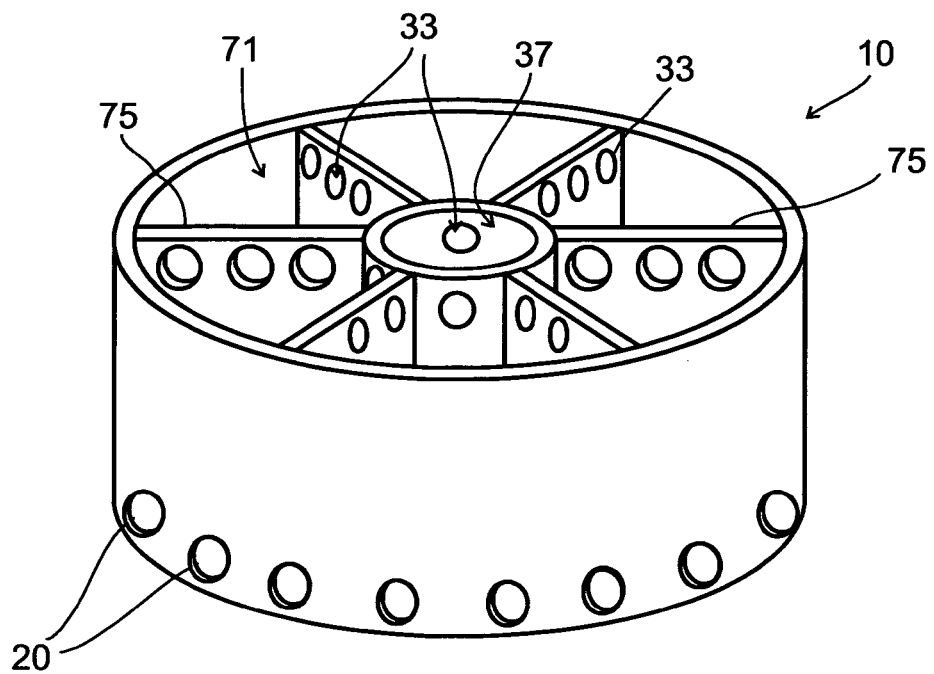
FIGS. 7A and 7B are simplified schematic drawings of exemplary underwater energy storage systems including partitioned tank with reinforced walls around an air entrance chamber in accordance with some embodiments of the present invention.
Figure 7B:
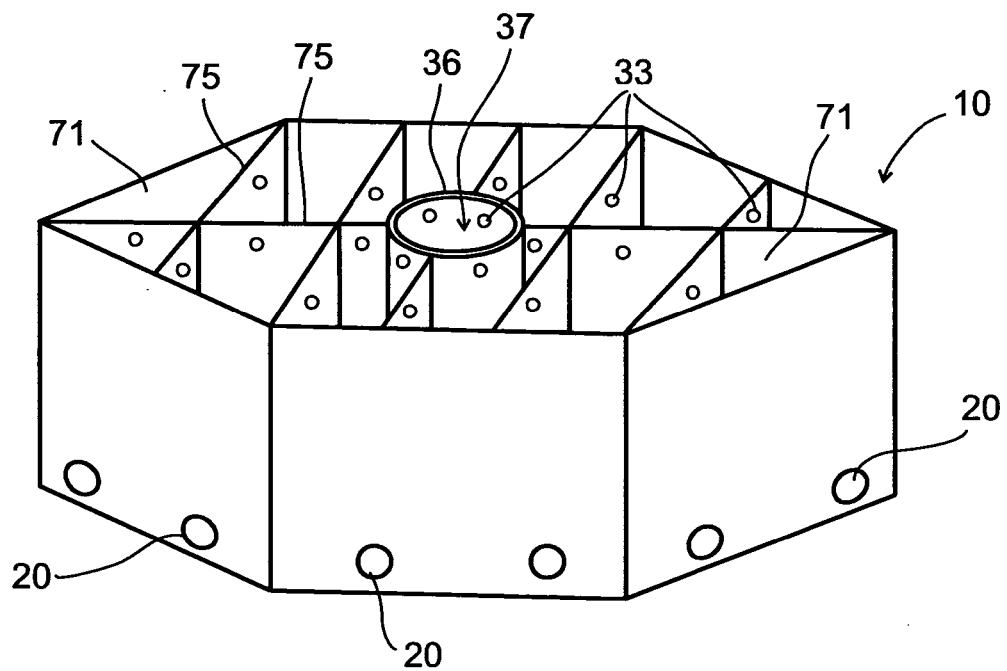

Reference is now made to FIGS. 7A and 7B illustrating simplified schematic drawings of exemplary underwater energy storage systems including partitioned tank with reinforced walls around an air entrance chamber in accordance with some embodiments of the present invention. According to some embodiments of the present invention, compressed air storage tank 10 is partitioned into a plurality of partitions 71, e.g. sector shaped partitions (FIG. 7A) or grid shaped partitions (FIG. 7B). Typically, each of the compartments includes air holes 33 through which air can flow between compartments and to and from an inlet and/or outlet air duct. According to some embodiments of the present invention, air flows in and out of tank 10 via one or more central chambers 37 through which an inlet and/or outlet duct, e.g. duct 30, 31 and/or 32 connects to tank 10. According to some embodiments of the present invention, walls 36 defining chamber 37 are constructed to be wider and/or have more reinforcements than other walls of tank 10, e.g. walls 75. Optionally, walls 36 are constructed to withstand shockwaves that may occur as compressed air is feed into tank 10.

Figure 8:
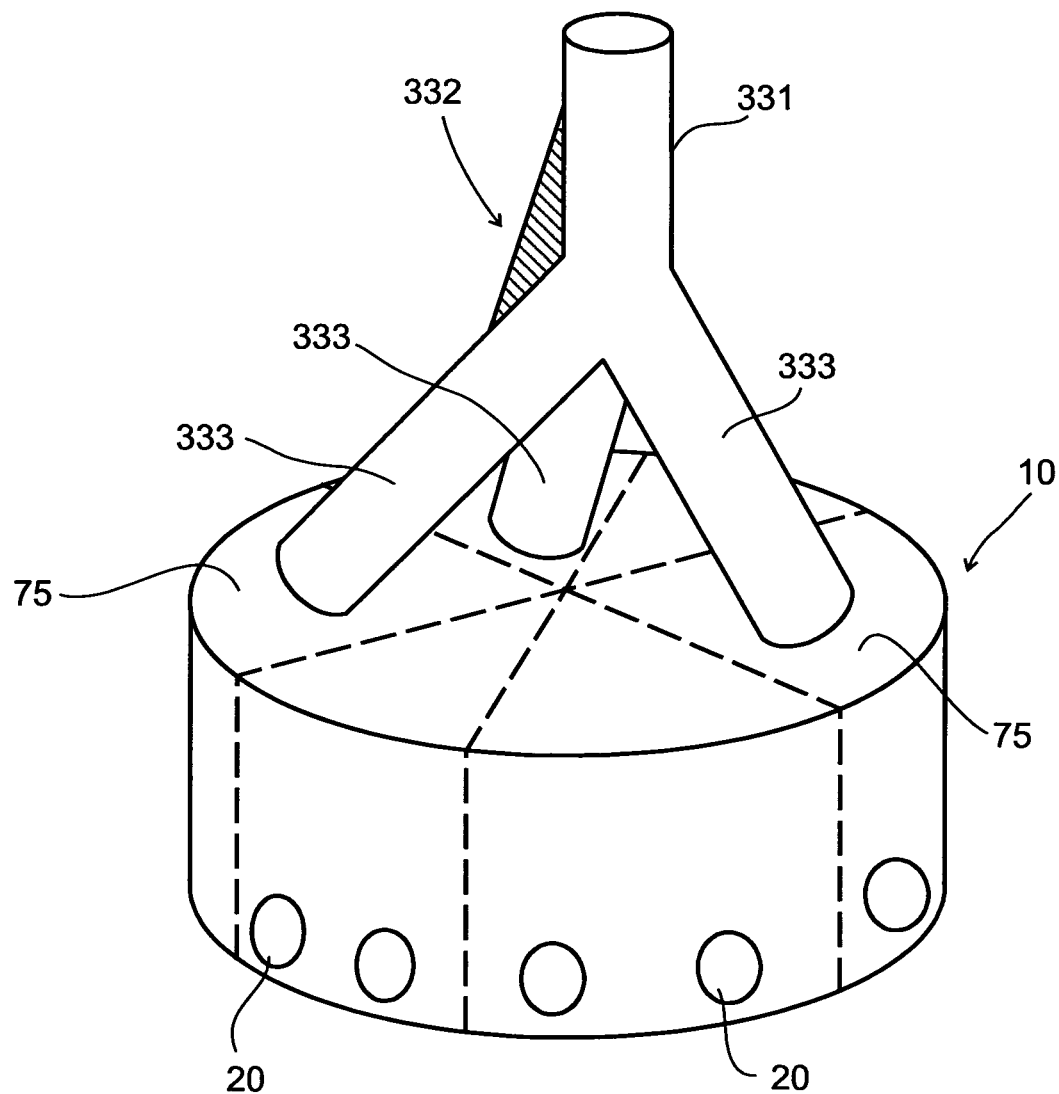
FIG. 8 is a simplified schematic drawing of an exemplary underwater energy storage system including a plurality of inlet/outlet ducts that converge into a single duct in accordance with some embodiments of the present invention.

Reference is now made to FIG. 8 illustrating a simplified schematic drawing of an exemplary underwater energy storage system including a plurality of inlet/outlet ducts that converge into a single duct in accordance with some embodiments of the present invention. According to some embodiments of the present invention, an air duct 331 branches into a plurality of ducts 333. In some exemplary embodiments, each of to ducts 333 connect to one of a plurality of chambers 75. In some exemplary embodiments, branching of air duct 331 provides reducing potential pressure drop between different compartments 75. Optionally, reinforcing structures 332 are added around a junction of the branching of ducts 333.

Figure 9:
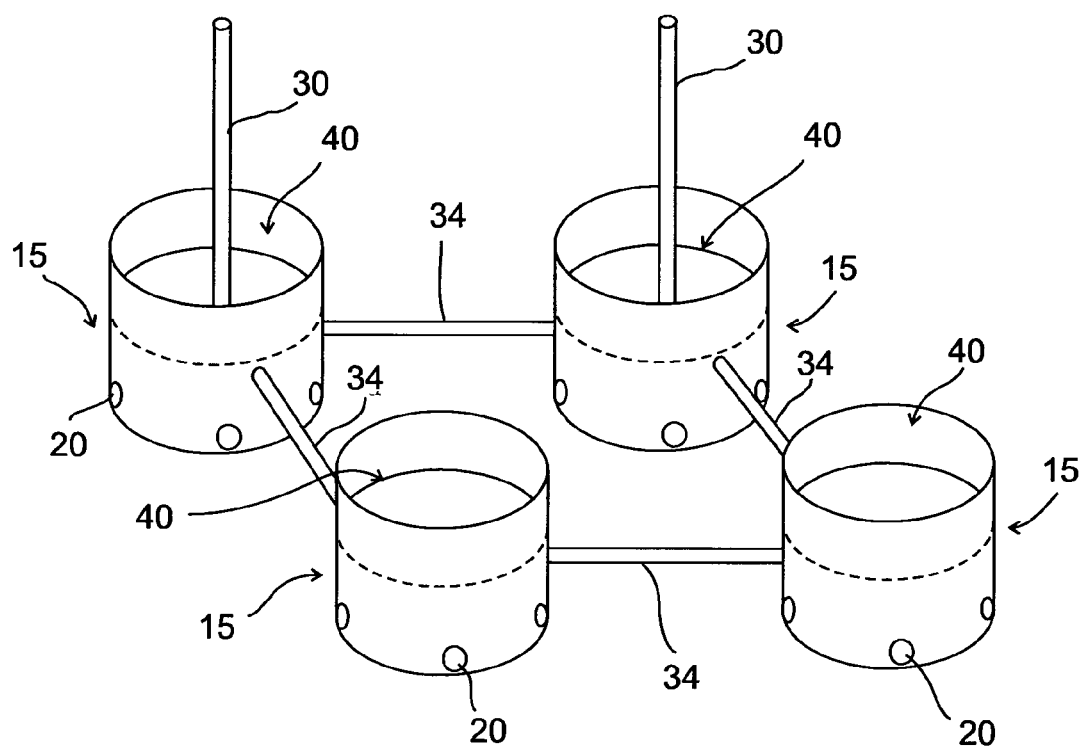
FIG. 9 is a simplified schematic drawing of an exemplary underwater energy storage system including a plurality of storage tank modules that are fluidly connected in accordance with some embodiments of the present invention.

Reference is now made to FIG. 9 illustrating a simplified schematic drawing of an exemplary underwater energy storage system including a plurality of storage tank modules that are fluidly connected in accordance with some embodiments of the present invention. According to some embodiments of the present invention, underwater energy storage system 110 is constructed from a plurality of underwater compressed air storage tanks 15 that are fluidly connected through air and/or gas ducts 34 connected between tanks 15. According to some embodiments of the present invention, each of tanks 15 additionally includes one or more water flow openings 20 allowing free flow of water into and out of each tank 15. In some exemplary embodiments, each tank 15 includes a compartment 40 for receiving weights such as sand gravel and rocks as described herein above.

According to some embodiments of the present invention, one or more air ducts 30 is connected to one or a portion of the tanks 15 on a first end and to a compressor(s) and/or power generating unit(s) above sea level (or water level) at an opposite second end. According to some embodiments of the present invention, air flow through air duct 30 extends or flows to all tanks 15 via air ducts 34. Alternatively, air duct 30 is replaced with air duct 331 (FIG. 8) that are partitioned into a plurality of ducts, each of which is directly connected to one of tanks 15 so that air flow in and out of duct 30 is directly communicated to each of tanks 15. Optionally in such a case, connecting air ducts 34 are not required. The present inventors have found that constructing an underwater energy storage system from a plurality of modular tanks 15 that can be used together to provide energy to a single plant and/or energy generating (or converting) unit, provides for adjusting a volume of an underwater energy storage system without having to redesign and/or resize the underwater compression tank. Optionally, each tank 15 has a uniform volume and shape. Alternatively, a number of different sized tanks are manufactured that can be combined in different ways to meet the demands of specific power sites. Constructing the underwater energy storage system with modular storage units, e.g. tanks 15 also provides for reducing cost of the system since the size and shape of the tanks are standardized and do not have to be redesigned for different systems.

It is noted that although most of the embodiments of the present invention describe an underwater compressed air tank with a flat roof, other shaped roofs are also in the scope of the present invention. Optionally roofs of one or more of tanks 10, 12-16 may have other shapes, e.g. a convex or concave shape.

Figure 10A:
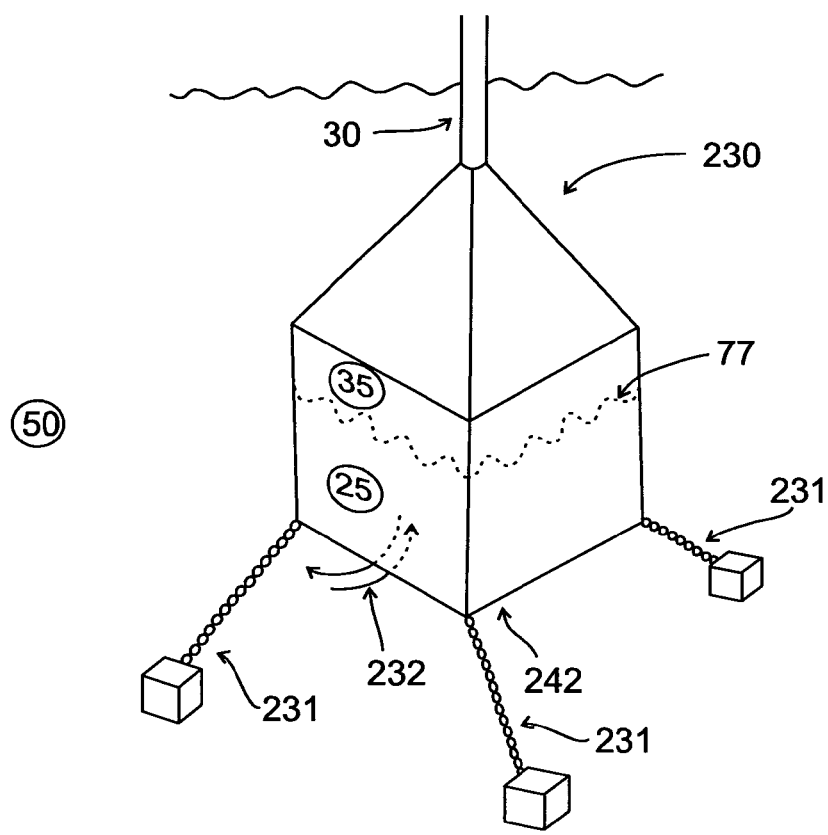
FIGS. 10A and 10B are simplified schematic drawings of exemplary underwater energy storage systems including a floorless storage tank that is anchored at a height above a seabed in accordance with some embodiments of the present invention.
Figure 10B:
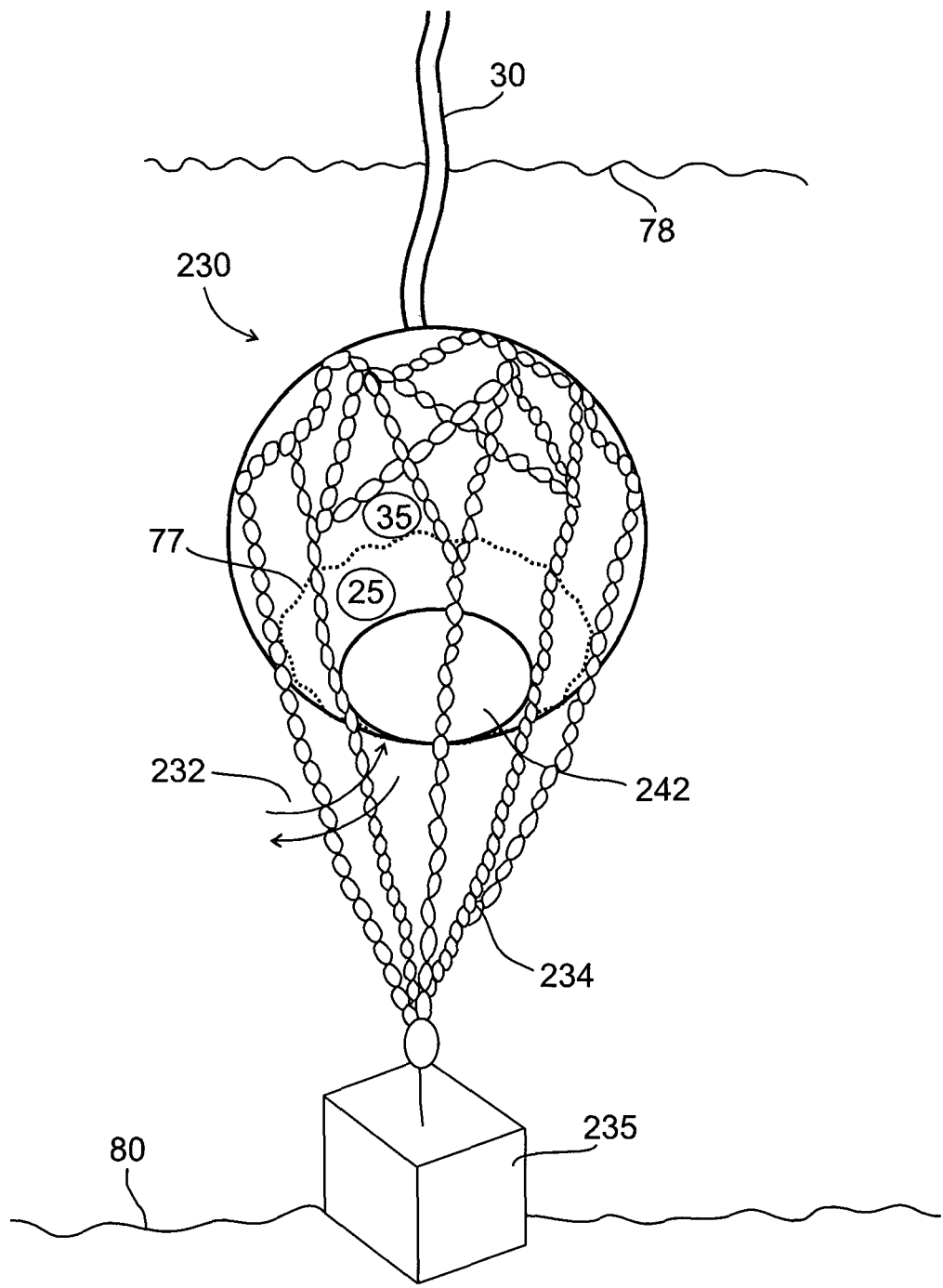

Reference is now made to FIGS. 10A and 10B illustrating simplified schematic drawings of exemplary underwater energy storage systems including a floorless storage tank that is anchored at a height above a seabed in accordance with some embodiments of the present invention. According to some embodiments of the present invention, underwater energy storage system 200 includes a floorless or bottomless tank 230 that is held at a defined height above a seabed 80 with one or more anchors 231 and/or with an anchor 235 holding a net 234 encompassing tank 230. In some exemplary embodiments, tank 230 is a rigid tank. Typically, a rigid construction is more durable than known flexible constructions and maintains a constant volume. Typically, flexible structures are more susceptible to damage due biological and/or chemical erosion occurring underwater or due to mechanical damage caused by fish, clams and the like that may damage flexibility of the bags and may tear or puncture the bags.

According to some embodiments of the present invention, tank 230 is held at a height above a seabed. Optionally, the height over which tank 230 is held enables unobstructed water flow 232 through open bottom 242 of the tank 230 even in cases when anchors 231 sink into the seabed. Typically, tank 230 includes an inlet/outlet air duct 30 connected to the top of tank 230 through which compressed air is pumped in for storage and/or released when energy to power a generator or device is required. Typically, tank 230 includes a volume of water 25 on a bottom portion of tank 230 and a volume of air 35 stored on an upper portion of tank 230. Typically, the level 77 of water in tank 230 is determined by the amount of compressed air stored in tank 230. Optionally, tank 230 is dome shaped. Optionally, tank 230 is constructed from a flexible and/or collapsible material. Optionally, tank 230 is in the form of a truncated sphere (FIG. 10B), a cylinder, a cone, and/or a hemisphere. In some exemplary embodiments, tank 230 is held at a defined height above seabed 80 with a net 234, e.g. a metal net that covers tank 230 and is held by a weight that may rest on seabed 80.

Figure 11:
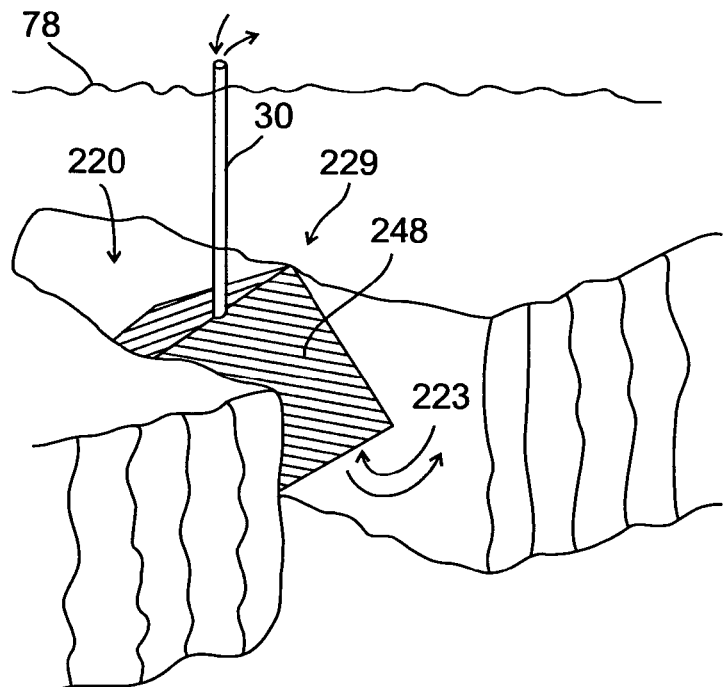
FIG. 11 is a simplified schematic drawing of an exemplary underwater energy storage system partially formed from natural underwater landscape formations in accordance with some embodiments of the present invention.

Reference is now made to FIG. 11 illustrates a simplified schematic drawing of an exemplary underwater energy storage system partially formed from natural underwater landscape formations in accordance with some embodiments of the present invention. According to some embodiments of the present invention, underwater energy storage system includes a tank 229 that is partially formed from existing under water structures such as walls of a canyon 220. In some exemplary embodiments, a roof 248 and/or one or more walls are anchored onto the canyon 220 to form a compressed air tank 229 with an open bottom that allows free water flow 232 from the bottom of the tank. Typically, compressed air is pumped into an upper portion of the tank with an air duct 30 and water enters through a bottom portion of tank 229. Optionally roof 248 is constructed from concrete casting.

Figure 12A:
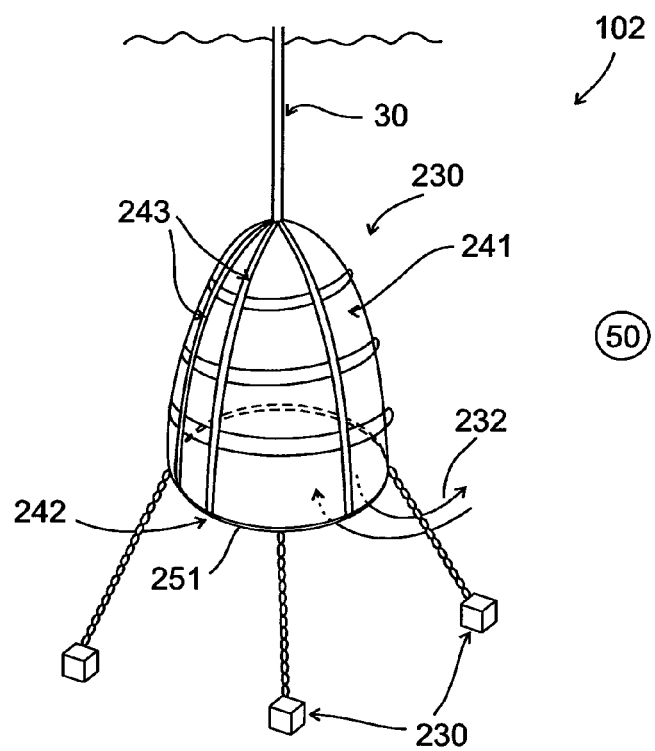
FIGS. 12A, 12B and 12C are simplified schematic drawings of exemplary underwater energy storage systems including a flexible storage bag in accordance with some embodiments of the present invention.
Figure 12B:
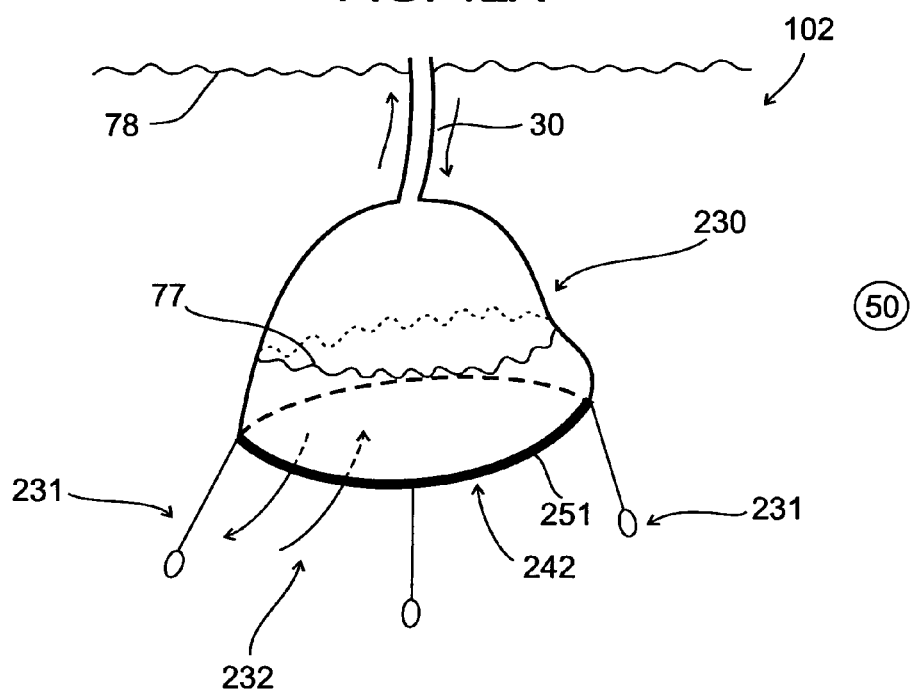
Figure 12C:
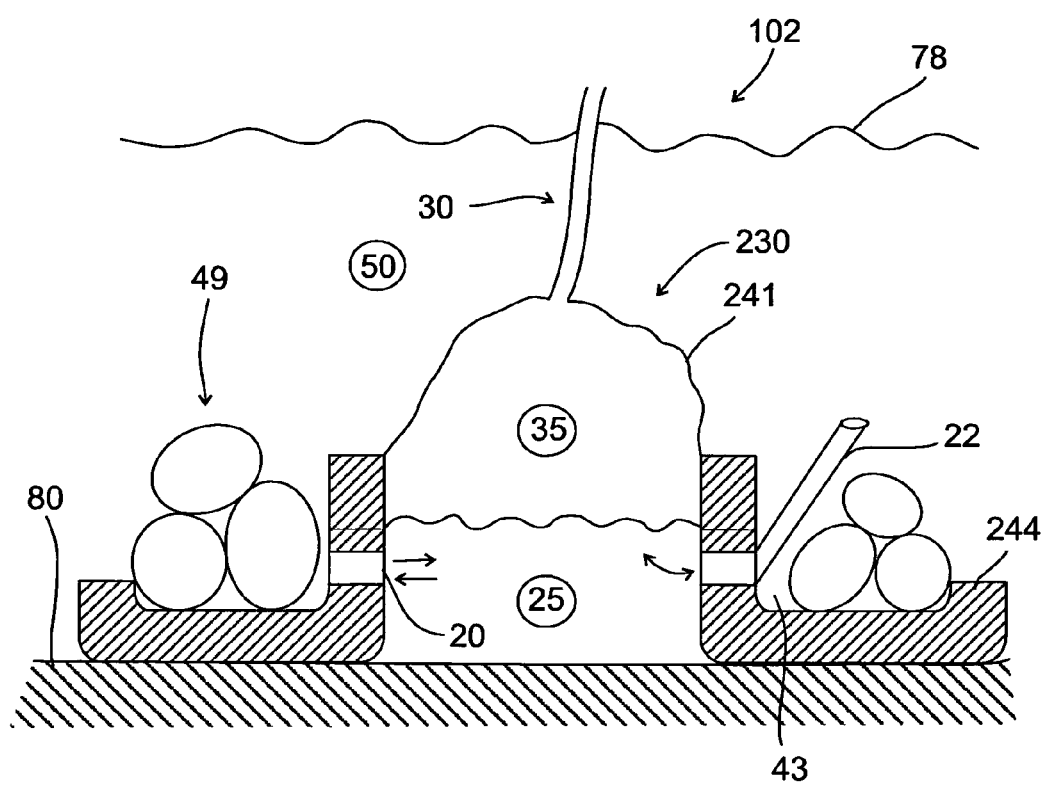

Reference is now made to FIGS. 12A, 12B and 12C illustrating simplified schematic drawings of exemplary underwater energy storage systems including a flexible storage bag in accordance with some embodiments of the present invention. According to some embodiments of the present invention, an underwater energy storage system 102 includes underwater compressed air tank 230 that is partially formed with flexible and/or collapsible material 241, e.g. a large plastic bag that forms an open bottom tank. In some exemplary embodiments, tank 230 is surrounded by a protective cage 243, e.g. a metal grating to provide rigidity to tank 230 and/or to strengthen construction of tank 230 (FIG. 12A). Optionally, a bottom 242 of tank 230 is maintained open by attaching collapsible material 241 to a rigid rim and/or ring 251 of cage 243. In other exemplary embodiments, tank 230 is not protected by a cage 243 but a rigid ring 251 is attached to open end of tank 230 (FIG. 12B) and is used to maintain tank 230 open and prevent it from collapsing completely. Typically, anchor 231 is attached to tank 230 through rigid structure of ring 251 and/or of cage 243 to prevent tearing of material 241. In yet other embodiments of the present invention, tank 230 is formed from a bag from flexible and/or collapsible material 241 that is maintained at a height above a seabed 80 with a frame 244 that sits on seabed 80 (FIG. 12C). Optionally, frame 244 forms cavity and/or hollow space 43 filled with rocks 49 providing a gravitation force for anchoring tank 230. In some exemplary embodiments, water flows freely into and out of tank 230 through water openings 20 and/or through duct 22 formed in (or extending from) frame 244 to counterbalance inflow or outflow of air 35 through inlet/outlet pipe 30.

Optionally, air tanks 230 may be particularly suitable when smaller volume tanks, e.g. having a diameter of a few meters, e.g. 5-10 meters are required. Typically, floorless air tanks, e.g. rigid or collapsible are smaller and also cheaper to manufacture and may be suitable for smaller scaled applications and/or as additions to larger scaled applications. Optionally, air tanks 230, e.g. collapsible or rigid may be particularly suitable for storing compressed air over a seabed that has a sharp incline, over a seabed that is generally not flat, e.g. has large rocks and/or over a seabed that is generally not suitable for supporting a large structure having a flat floor. In some exemplary embodiments, tank 230 designed to float over a seabed provides a cost effective alternative to flattening out a rocky area of a seabed so that a tank may be positioned over the seabed.

Figure 13:
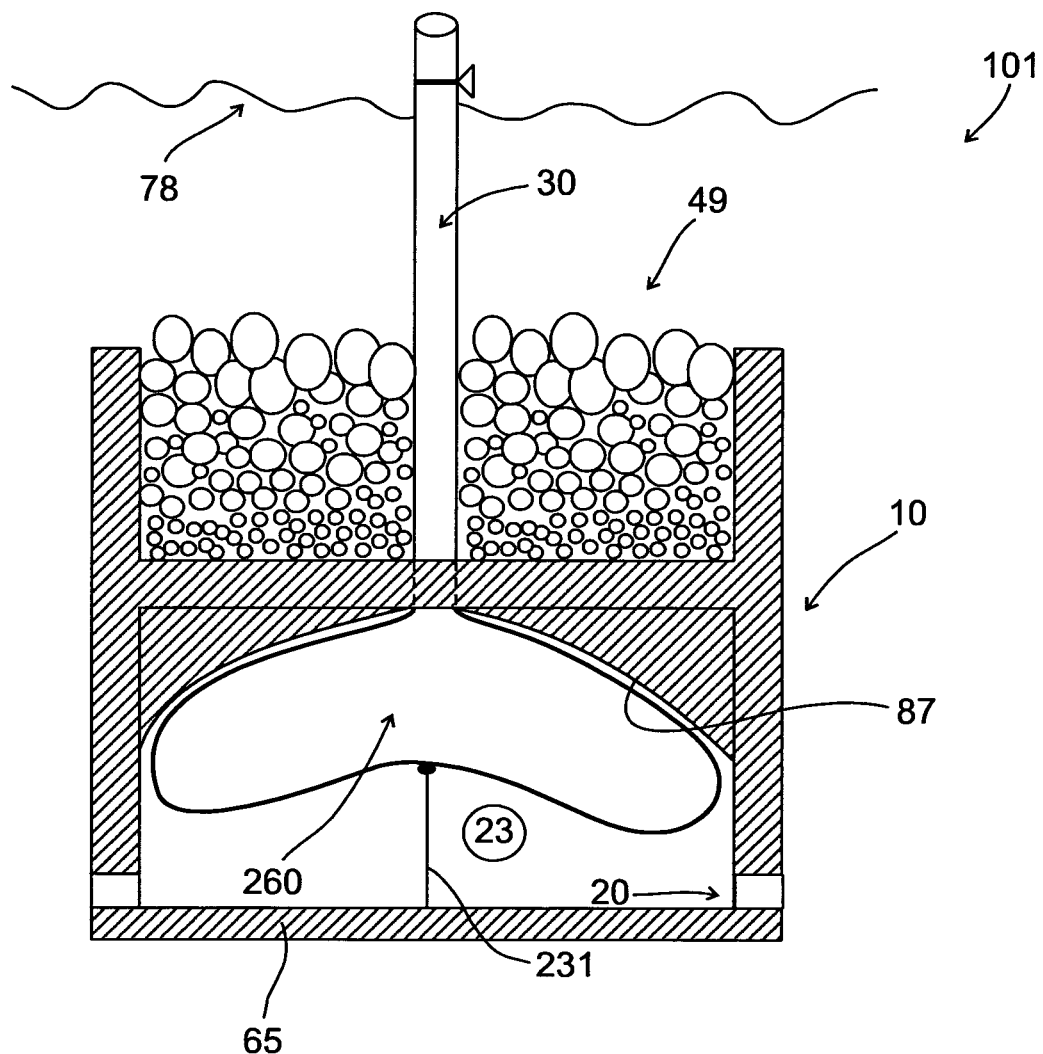
FIG. 13 is a simplified schematic drawing of an exemplary underwater energy storage system including a flexible compressed energy storage container housed in rigid storage underwater tank in accordance with some embodiments of the present invention.

Reference is now made to FIG. 13 illustrating a simplified schematic drawing of an exemplary underwater energy storage system including a flexible compressed energy storage container housed in rigid storage underwater tank in accordance with some embodiments of the present invention. According to some embodiments of the present invention, underwater energy storage system 101 includes rigid storage tank 10 that stores compressed soluble gases or fluids in a flexible bag 260 housed within rigid storage tank 10. Optionally, bag 260 stores condensed carbonic gas. In some exemplary embodiments, the gases or fluids are feed into bag 260 via duct 30 that extends above water level 78. Optionally the soluble gases and/or liquids are hazardous materials that require storage in safe and stable conditions. Optionally, rigid construction of tank 10 protects container 260 from swaying and erosion, e.g. due to biological and/or chemical erosion or due to mechanical damage caused by fish, clams and the like that may damage flexibility of the bags. Typically, the rigid construction of tank 10 provides stability, anchoring and withholding pressures.

In some exemplary embodiments, tank 10 is anchored to a seabed and allows free water flow into and out of tank 10 through one or more water channels 20. Typically, free water flow through channels 20 provide for stabilizing pressure in tank 10. For example as more material is feed into bag 260, bag 260 expands and water 25 is expelled from tank 10. Optionally, a flexible cable or line 231 is attached to a bottom of bag 260 on one end and to floor 65 on another end to avoid jamming opening to air duct 30. Typically, inner walls 87 of tank 10 are smooth and/or rounded to protect bag 260 from to being punctured. Optionally, inner walls 87 are additionally coated with smooth low friction and/or friction protective materials such as various polymers.

Figure 14A:
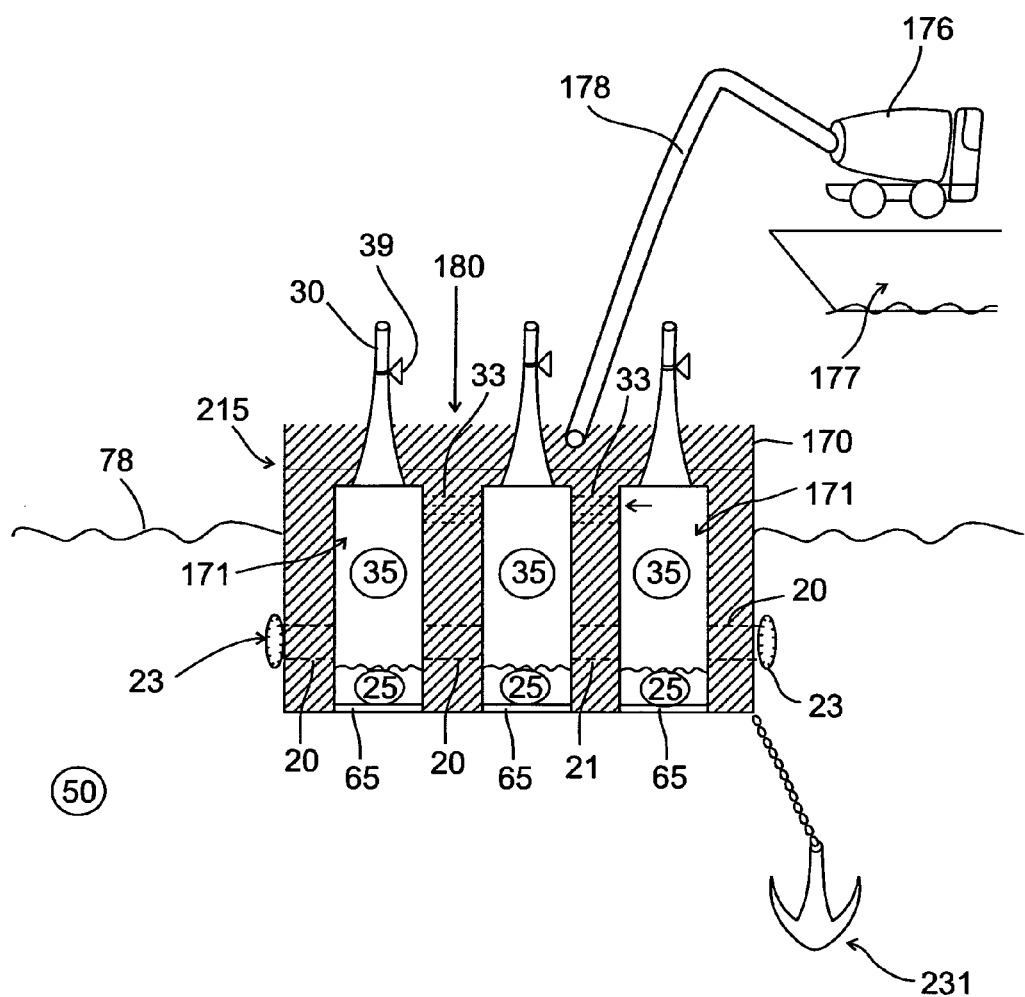
FIGS. 14A and 14B are simplified schematic drawings showing an exemplary method for casting and sinking an exemplary underwater energy storage system in accordance with some embodiments of the present invention.
Figure 14B:
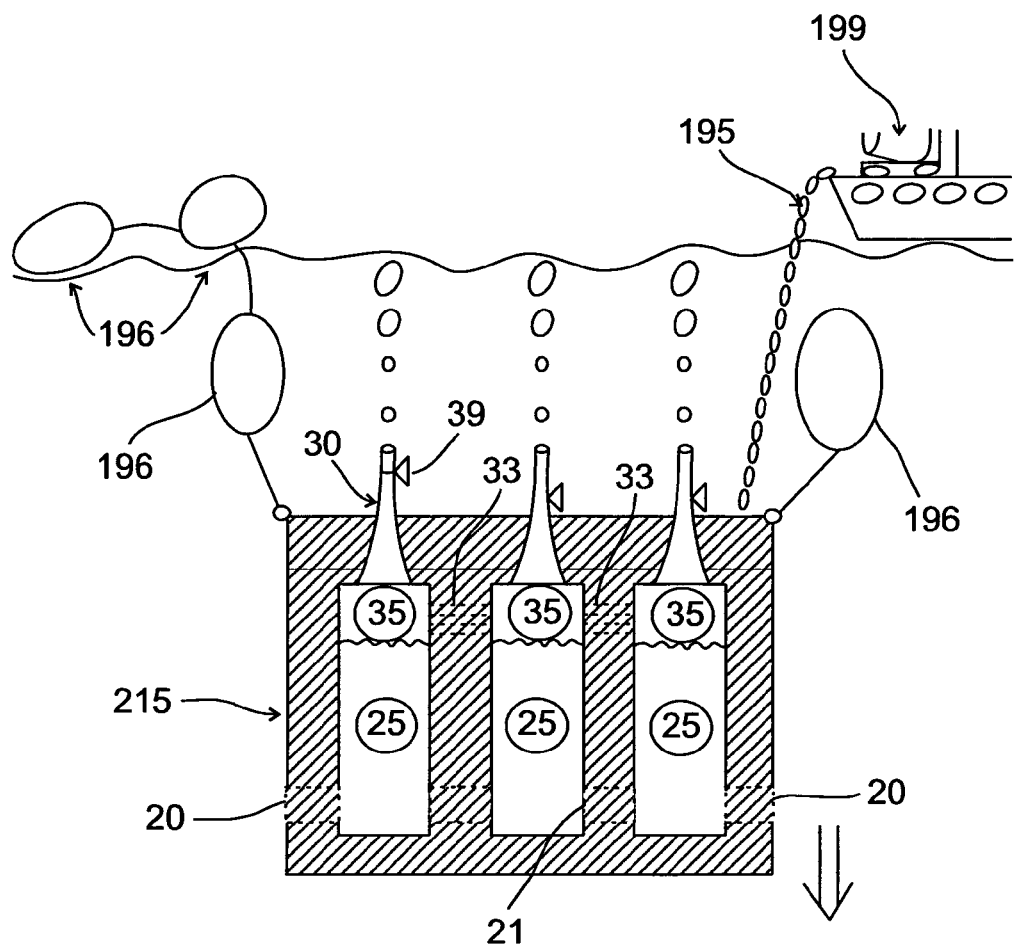

Reference is now made to FIGS. 14A and 14B illustrating simplified schematic drawings showing an exemplary method for casting and sinking an exemplary underwater storage system in accordance with some embodiments of the present invention. According to some embodiments of the present invention, an underwater energy storage system 1215 includes a metal or polymer frame or mold 170 that defines one or more tanks 171 for storing energy, e.g. in the form of compressed air. In some exemplary embodiments, each tank 171 is fitted with a floor 65. Optionally, tank 171 does not include a floor. Optionally, the floor is a metal or polymer floor. Typically, frame 170 includes one or more openings though which water pipes 21 are fitted between neighboring tanks 171 and through which water ducts between the chambers and outside walls are fitted. Typically, frame 170 includes one or more openings through which one or more inlet/outlet pipes 30 are fitted. In some exemplary embodiments, frame 170 additionally includes one or more openings through which air pipes 33 between neighboring tanks are fitted. According to some embodiments of the present invention, frame 170 defines an inner portion and/or cavity 180 that can be filled with material, e.g. concrete to complete construction of system 1215. In some exemplary embodiments, frame 170 is filled on site, e.g. after transportation to a desired sinking location.

According to some embodiments of the present invention, frame 170 is transported on water to a desired sinking location. Typically, during transport, water openings 20 are closed so that water does not enter tanks 171. Optionally, once a desire sinking location is reached, system 1215 is anchored with one or more anchors 213 so immobilize system 1215. Optionally, frame 170 is transported by a ship and a crane is used to lower frame into the water. According to some embodiments of the present invention, concrete is poured into cavity 180 while system 1215 is floating over a desired sinking location. In some exemplary embodiments, a concrete mixer 176 brought to the spot on board a ship 177 or barge pours concrete into cavity 180 using a concrete pump 178 to fill cavity 180. In some exemplary embodiments, air trapped in tanks 171 keeps system 1215 afloat while the cement is being poured. Optionally one or more buoys 196 are used keep system afloat while the cement is being poured.

According to some embodiments of the present invention, once the casting is completed and the casting is sufficiently dray, system 1215, valves 23 on water openings 20 and valves 39 on air pipes 30 are opened and so that water enters tanks 171 and system 1215 can sink to the desired location. Optionally, if tanks 171 are floorless, channels 20 are always open and only valves 39 are opened to allow air release through pipe 30. In some exemplary embodiments, buoys, e.g. buoy chains are used to stabilize system 1215 and control the sinking speed.

Figure 15:
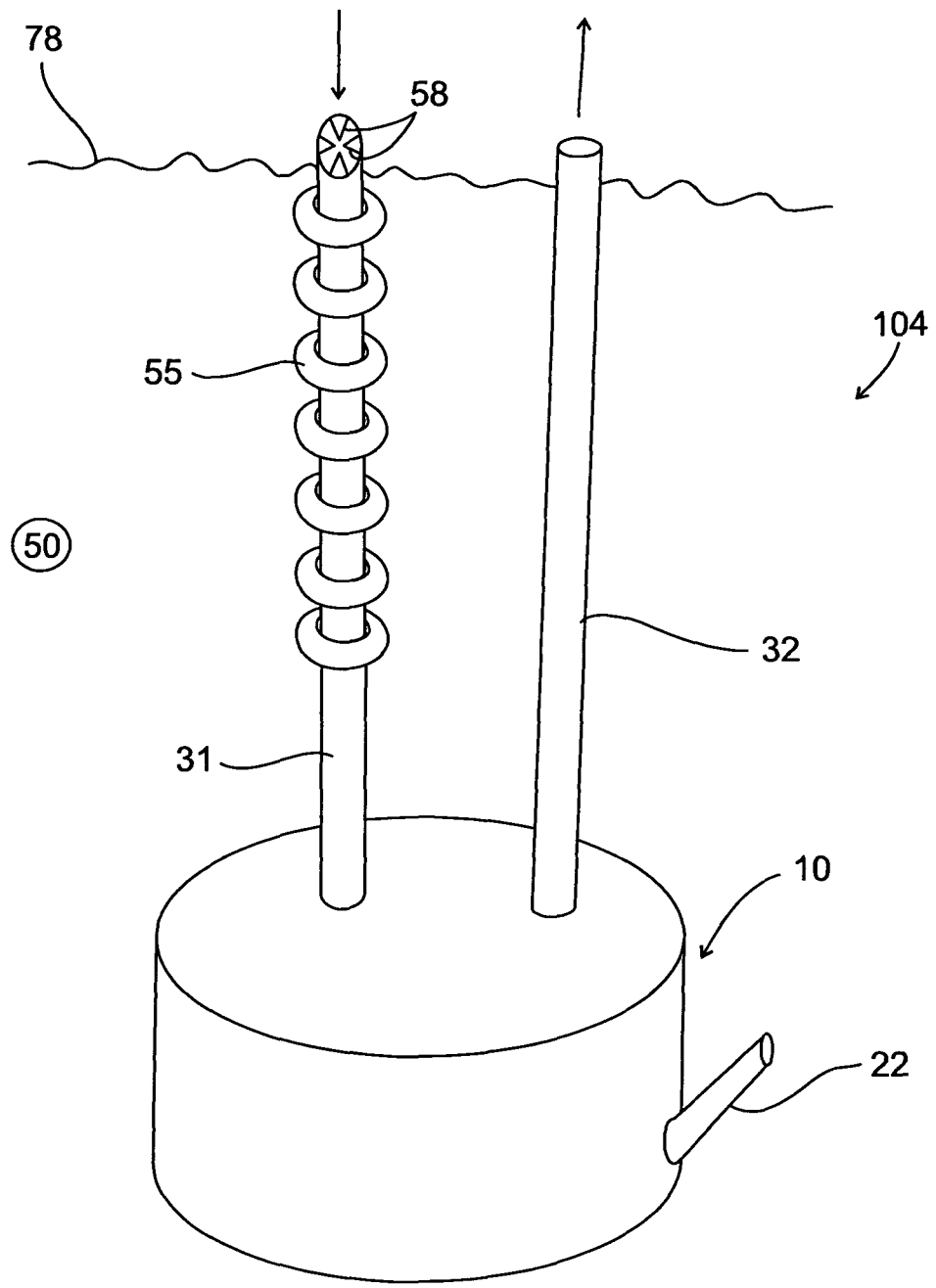
FIG. 15 is a simplified schematic drawing of an exemplary underwater energy storage system including an inlet pipe for cooling compressed air in accordance with some embodiments of the present invention.

Reference is now made to FIG. 15 illustrating an a simplified schematic drawing of an exemplary underwater energy storage system including an inlet pipe for cooling compressed air in accordance with some embodiments of the present invention. According to some embodiments of the present invention, underwater energy storage system 104 includes an inlet pipe 31 through which compressed air flows from a compressor (not shown) to a compressed air tank 10. In some exemplary embodiments, compressed air pumped into pipe 31 is at a high temperature, e.g. hundreds of degrees Celsius and requires cooling prior to entering tank 10. If air enters underwater tank 10 at significantly higher temperatures than surrounding environment, the temperature drop across tank 10 may cause cracks and/or damage to tank 10. In some exemplary embodiments, inlet pipe 31 includes one or more heat exchange ribs along a length of inlet pipe 31 to promote cooling of air flowing through pipe 31. In some exemplary embodiments pipe 31 includes one or more ribs 55 encompassing outer diameter 31 for enhancing heat exchange between water 50 and air within pipe 31. Optionally, the outer ribs 55 shaped as flat rings. Optionally, outer ribs 55 are constructed to be aligned with water currents typical found in an area where system 104 is situated. Optionally, rib 55 is a single spiral shaped rib that extends along a length of pipe 31. Optionally, walls of tank 10 include heat transfer elements that are operable to release heat that may be stored in tank 10. Optionally water outlet 22 provides a mechanism for releasing heat accumulated in tank 10.

Figure 16:
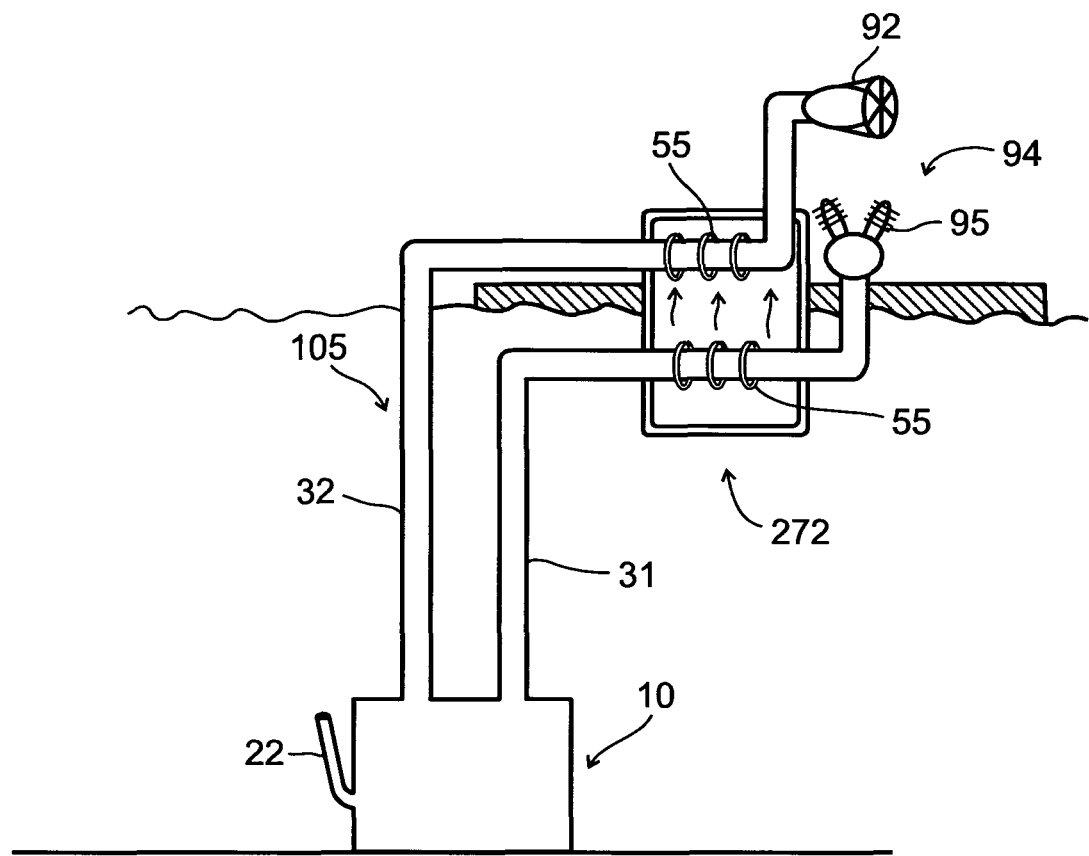
FIG. 16 is a simplified schematic drawing of an exemplary heat exchange and heat preservation system for use with an underwater energy storage system in accordance with some embodiments of the present invention.

Reference is now made to FIG. 16 illustrating a simplified schematic drawing of an exemplary heat exchange and heat preservation system for use with an underwater energy storage system in accordance with some embodiments of the present invention. According to some embodiments of the present invention, underwater energy storage system 105 is an adiabatic system (or semi-adiabatic system) that retains heat produced to by compression and returns it to the air when the air is expanded to generate power. Typically, during compression a large amount of heat is created in compressor 94 and inlet pipe 31 carrying air from compressor to underwater tank 10. In some exemplary embodiments, pipe 31 first passes through a fluid reservoir and/or a heat exchange pool 272 where heat in pipe 31 is released. In some exemplary embodiments, reservoir 272 is thermally isolated. Optionally, pipe 31 includes one or more ribs 55 around a portion pipe 31 within fluid reservoir 272 for enhancing heat exchange within the reservoir. Optionally, compressor 94 includes cooling ribs 95 that are additionally submerged in fluid of fluid reservoir 272 for cooling (submerging is not shown). Typically, heat accumulated rises in reservoir 272.

In some exemplary embodiments, heat accumulated in reservoir 272 rises to an upper portion of the tank and is used to heat air released from tank 10 through pipe 32 prior to being used for operating a turbine 92. Typically, pipe 32 passes through an upper portion of reservoir 272 where the heated fluid rises. Optionally, pipe 32 also includes one or more ribs 55 around a portion of pipe 32 within reservoir 272 for enhancing heat exchange. Typically, heat exchange with pipe 32 results in cooling and cooled fluid flows to a bottom of reservoir 272 which can be later used to cool air through pipe 31.

Figure 17:
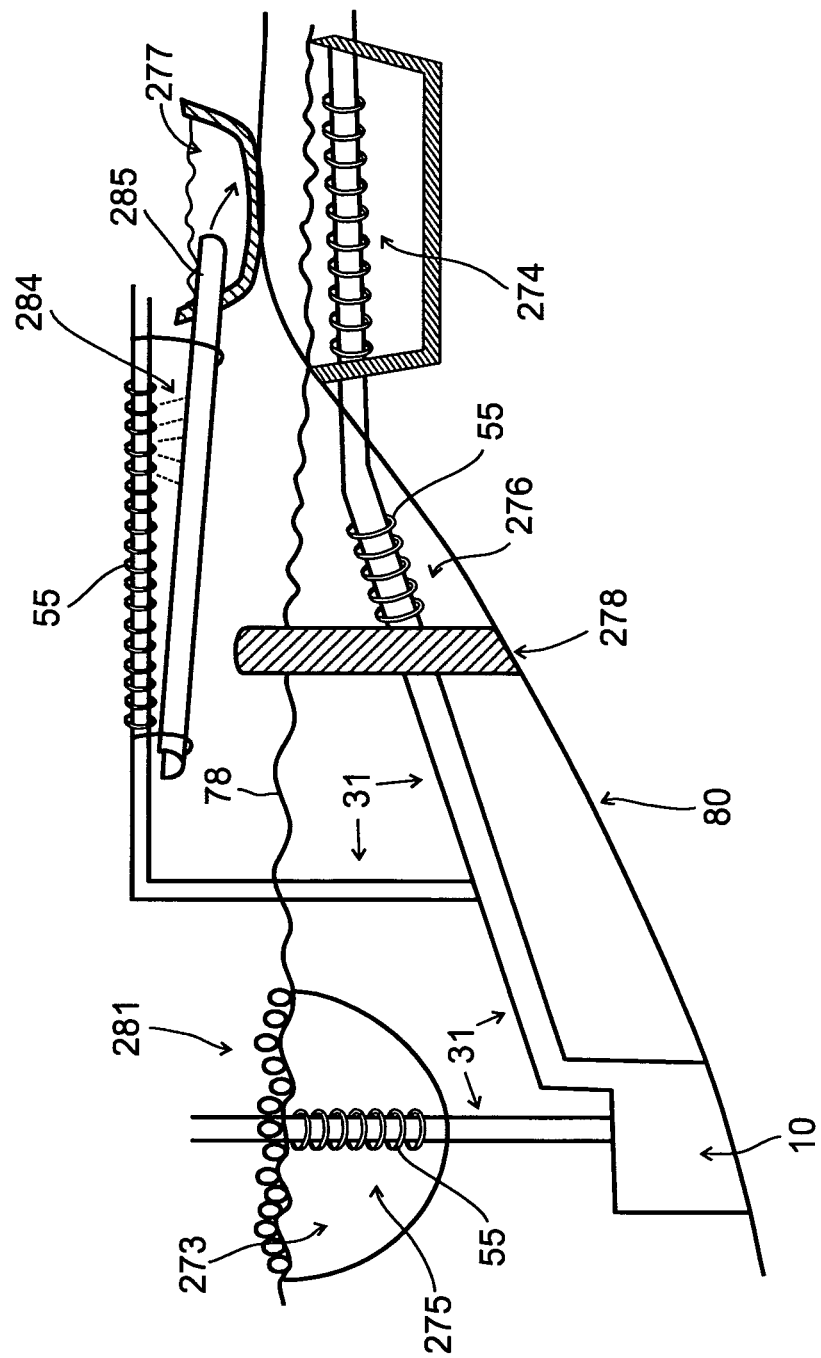
FIG. 17 is a simplified schematic drawing of a variety of exemplary heat preservation pools for use with an underwater energy storage system in accordance with some embodiments of the present invention.

Reference is now made to FIG. 17 illustrating a simplified schematic drawing of a variety of exemplary heat preservation pools for use with an underwater energy storage system in accordance with some embodiments of the present invention. According to some embodiments of the present invention one or more air flow pipes 31 providing air flow from an air compressor to an underwater compressed air storage tank 10 pass through a heat preservation pool 273 and/or a heat exchange unit to accumulate heat created during compression that can later be used for heating air discharged from tank 10 (air discharge pipe is not shown). Typically air flow pipe includes ribs 55 for enhancing heat exchange. In some exemplary embodiments a pool 273 is constructed from an isolating material, e.g. a flexible or rigid isolating material and is filled with water. Typically, a volume of pool 273 will depend on a volume of a tank 10 and depth (or compression level) in which it is stored and will typically be larger than thank 10. In one example, a tank 10 stored at a depth of about 400 meters may have a volume of about 30,000 m³ and an associated pool 273 may have a volume of 10,000 m³. In some exemplary embodiments, pool 273 floats in seawater 50. Optionally, buoys 281 are used to help pool 273 float. Optionally buoys 281 are also designed to cover water surface in pool and thereby prevent evaporation of the water in pool 273. Alternatively and/or additionally, a pool 273 lies near a beach or on land and air flow pipes 31 pass through pools 273. In some exemplary embodiments, pool 276 is formed with a damn 278 constructed at a distance from a beach, and the seabed 80 between the damn and the beach. Typically damn 278 extends above sea level 78 and separates a body of water from the sea to form pool 276. In some exemplary embodiments, heat exchange is performed over surface water 78 and used to condensed water vapors in air. Optionally, condensed water vapors 284 are collected in a collection channel 285 and directed to a collection tank 286. Optionally, condensed water vapors in collection tank 286 can be used as a fresh water source.

Figure 18:
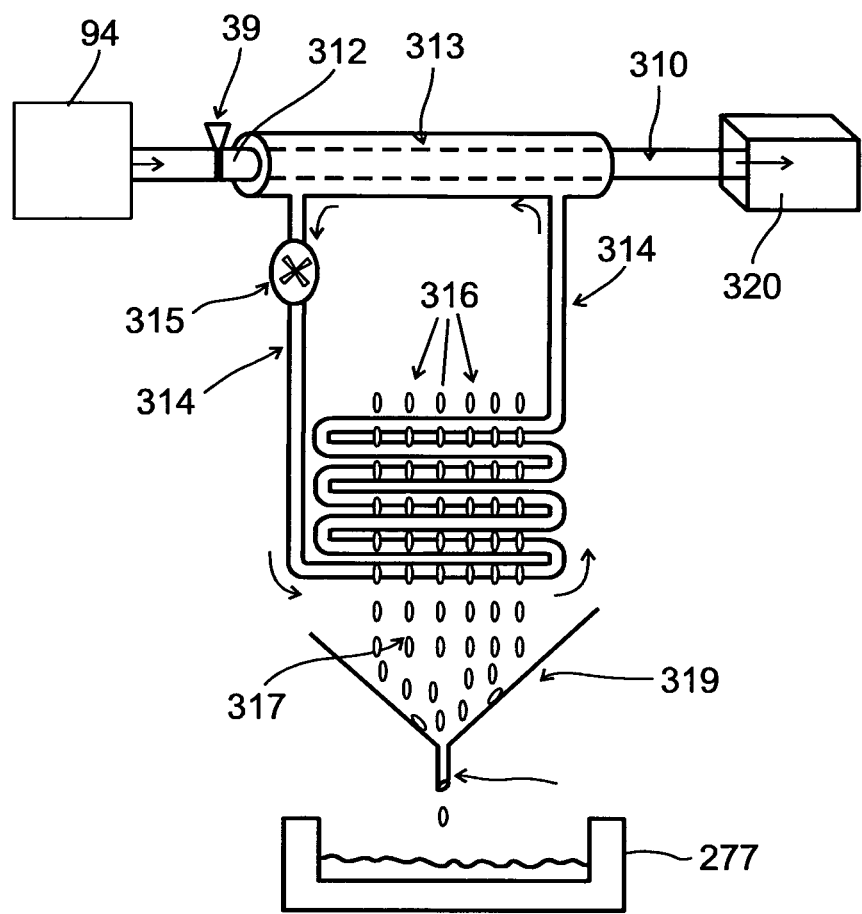
FIG. 18 is a simplified schematic drawing of an exemplary heat exchange unit for desalinating water for use with an underwater energy storage system in accordance with some embodiments of the present invention.

Reference is now made to FIG. 18 illustrating an exemplary heat exchange unit for desalinating water for use with an underwater energy storage system in accordance with some embodiments of the present invention. According to some embodiments of the present invention, an air release pipe 32 gathers heat from the surroundings when the pressure begins to fall. Typically, air from pipe 32 cools significantly as pressure falls. In some exemplary embodiments, air from pipe 32 is conducted through a larger, thermally insulated pipe 312 around which a fluid with a low freezing temperature flows, e.g. through a vessel 313. In some exemplary embodiments, discharged air is further heated by passing it through a heat reservoir 320 prior to using the air as an energy source, e.g. to operate a turbine.

In some exemplary embodiments a pump 315 pumps fluid in vessel 313 through a pipe system 314 and/or heat exchanging ribs 316. In some exemplary embodiments, heat exchanging ribs 316 are positioned over a water surface and due to cooling, water vapors 317 condense on them and flow down into a collection unit 319 including a collection tank 277. Alternatively, heat exchanging ribs 316 are immersed in sea water and the cooling provided causes the surrounding water, e.g. water in a collection tank to freeze. Optionally, the thawed ice is collected and used as a fresh water source.

Figure 19A:
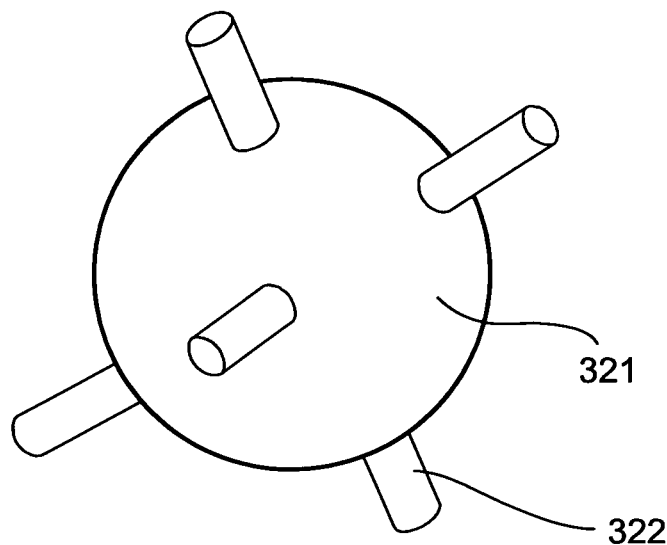
FIGS. 19A and 19B are simplified schematic drawings of exemplary thermal energy storage elements for use with an underwater energy storage system in accordance with some embodiments of the present invention.
Figure 19B:
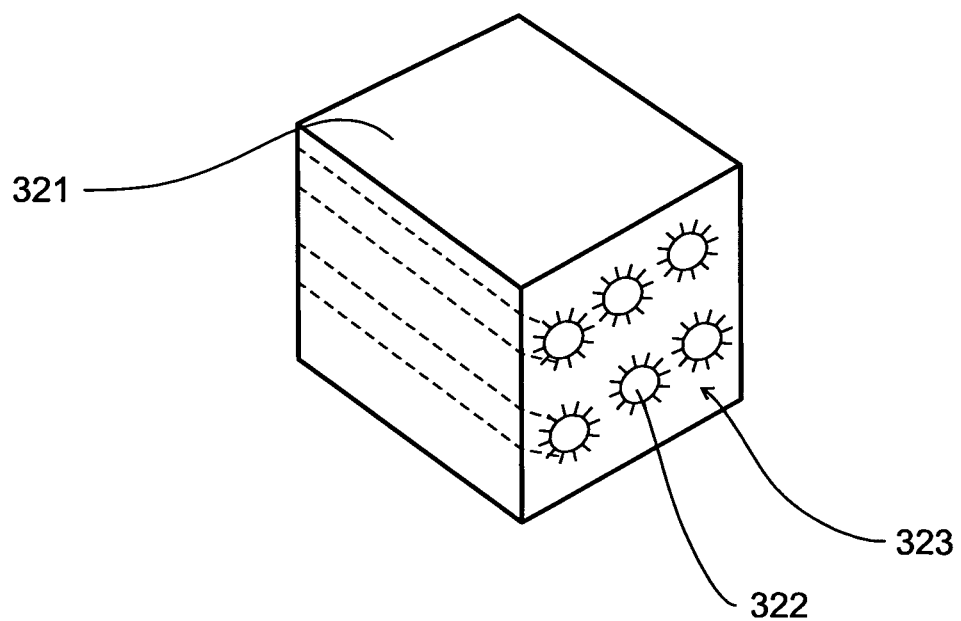

Reference is now made to FIGS. 19A and 19B illustrating simplified schematic drawings of exemplary thermal energy storage elements for use with an underwater to energy storage system in accordance with some embodiments of the present invention. According to some embodiments if the present invention, heat generated during air compression is stored in solid thermal storage elements. In some exemplary embodiments, the solid thermal storage elements is formed from a solid ball 321, e.g. a cement or ceramic ball for storing heat that includes one or more metal rods 322 that extend out of and/or through cement ball 322. Optionally metal rods 322 is used enhance heat transfer into cement ball 322. Optionally, material other than metal is included in balls 321 to increase heat transfer. Typically, rods 322 embedded in ball 322 enhance heat exchange between the surrounding environment and cement balls 321. Optionally, a material in the form of a powder or small particles, e.g. nano-particles is used as solid thermal storage elements. The present inventor has found adding material such as metal, e.g. such as rods 322, powder or small particles that has a high thermal conductivity to materials that can store heat, e.g. ceramics and concrete with low thermal conductivity improves the efficiency thermal storage element.

According to some embodiments of the present invention, a pipe including high temperature air flowing from a compressor to an underwater compressed air tank passes through a reservoir filled with balls 321 prior to entering into underwater storage tank. Heat dissipated from the pipe is stored in balls 321 for later use.

In some exemplary embodiments, a solid thermal storage element is in the form of a solid block 323, e.g. a cuboid or cylinder shaped block formed around one or more inlet air pipes 31 and discharge air pipe 32. Typically, solid block is constructed from cement or a ceramic material. Optionally, the cement or ceramic is mixed with metal fibers or metal particles for enhancing heat transfer. Optionally, ribs 324, e.g. running lengthwise along pipe 31 within solid block provide in enhancing heat exchange between air in pipes 31 and 32 and solid block 323. Optionally, heat accumulated in sold block 323 during off-peak hours when air is compressed and directed into an underwater storage tank, is stored in block 323 and later used to heat discharge air used to generate power during peak hours.

It is noted that although most of the embodiments of the present invention have been described in reference to underwater energy storage systems that are stored in the sea, the embodiments of the present invention are not necessarily limited in that respect and can also be applied for underwater energy storing in other water bodies, e.g. lakes and reservoirs.

It is noted that although most of the embodiments of the present invention have been described in reference to storage of compressed air, other gases and/or fluids may be stored with underwater energy storage system described hereinabove.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. An underwater energy storage system comprising:
   a tank for storing a compressed gas that is adapted to be stored underwater, wherein the tank encloses a constant volume,
   the tank comprising:
   at least one water opening through which water from surrounding environment can flow into and out of the tank;
   at least one gas opening through which the compressed gas is received; and
   floating structures housed in the tank and adapted to cover a surface of water contained in the tank;
   at least one duct communicating between the at least one opening for gas flow and a source of compressed gas; and
   a compartment constructed over a roof of the tank, wherein said compartment is adapted for receiving weights at a sinking site of the tank.

2. The system of claim 1, wherein the compartment is formed with a banister encompassing the roof of the tank.

3. The system of claim 2, wherein the banister is an integral part of walls of the tank that extends above a height of the roof.

4. The system of claim 2, wherein the tank includes sloped walls, and wherein the banister at least partially encompasses the walls of the tank.

5. The system of claim 1, wherein the compartment is partitioned with partitioning walls adapted to provide structural support for the roof of the tank.

6. The system of claim 1, wherein the compartment includes a door, wherein the door provides for releasing weights received in the compartment when opened.

7. The system of claim 1, wherein the weights include at least one of rocks, sand and gravel.

8. The system of claim 1, wherein the tank includes walls that have a thickness that increases over a height of the walls.

9. The system of claim 1, wherein the tank includes walls with structural reinforcements, wherein an amount of the reinforcement provided increases over a height of the tank.

10. The system of claim 1, wherein the tank is partitioned into a plurality of chambers, said chambers include chamber walls with gas openings that provide free gas flow between the chambers and wherein each of the chambers includes water opening through which water from surrounding environment can flow.

11. The system of claim 10, wherein a chamber wall that surrounds a chamber that directly communicates with the at least on duct through which the compressed gas is received, is provided with added reinforcements.

12. The system of claim 10, wherein the at least one duct through which the compressed gas is received branches into a plurality of ducts each of which directly communicates with one of the chambers of the tank.

13. The system of claim 1, comprising:
   a plurality of tanks; and
   gas ducts connected between gas openings of each of the plurality of tanks, wherein the gas ducts provide free gas flow between the plurality of tanks.

14. The system of claim 1 comprising a water duct connected the at least one water opening and extending upward therefrom, said duct adapted to provide a water opening at a height above the water opening of the tank.

15. The system of claim 1, comprising an extension extending from a floor of the tank, the extension defining an open channel in which weights can be contained for anchoring the tank on a bed of a water body.

16. The systems of claim 1, wherein the tanks includes prongs extending outward from a floor of the tank, wherein said prongs are adapted to be embedded in a bed of a water body for stabilizing the tank on the bed of the water body.

17. The system of claim 1, wherein the tank is casted with concrete.

18. The system of claim 1, wherein the tank includes inner walls that are coated with a metal layer.

19. The system of claim 18, wherein a thickness of the metal layer increases over a height of the tank.

20. The system of claim 1, wherein the tank includes outer walls that are coated with a metal layer.

21. The system of claim 1, wherein the at least one duct communicating between the at least one opening for gas flow and a source of compressed gas is lined with a plurality of ribs adapted to cool the compressed gas as it flows from the source to the tank.

22. The system of claim 21, wherein at least a portion of the ribs are outer ribs that encompass an outer diameter of the duct and wherein the outer ribs are structured to be in line with a direction of current flow in the sinking site of the system.

23. The system of claim 1, comprising at least one duct communicating between the at least one opening for gas flow in the tank and a pneumatic device.

24. The system of claim 23, comprising a heat exchange unit for transferring heat generated by the source of compressed gas to gas flowing from the at least one duct communicating between the at least one opening for gas flow in the tank and a pneumatic device.

25. The system of claim 24, wherein the heat exchange unit includes a heat exchange pool formed between a damn constructed at a distance from a beach and the beach.

26. The system of claim 24, wherein the heat exchange unit includes at least one thermal energy storage element through which the at least one duct communicating between the at least one opening for gas flow and a source of compressed gas and the at least one duct communicating between the at least one opening for gas flow in the tank and a pneumatic device pass through.

27. The system of claim 23, comprising a heat exchange unit adapted to harness cooling of gas discharged from the tank for desalinating water.

28. The system of claim 1, wherein the compressed gas is air.

29. The system of claim 1, wherein the compressed gas is carbonic gas.

30. The system of claim 1, wherein the tank includes a floor.

31. An underwater energy storage system comprising:
- a plurality of tanks for storing compressed air underwater, wherein each of the tanks include at least one water opening through which water from a surrounding water body freely flows into and out of the tank and at least one air opening for receiving and discharging the compressed air, wherein free flow through the at least one water opening is responsive to air flow into and out of the tank;
- floating structures housed in at least one of the plurality of tanks and adapted to cover a surface of water contained in the at least one of the plurality of tanks;
- a first duct for communicating air flow between the at least one air opening of at least one of the plurality of tanks and a source of compressed air; and
- at least one second duct for communicating air flow between the at least one air opening of each tank.

32. The system of claim 31, comprising a water duct connected to the at least one water opening of each of the plurality of tanks and extending upward therefrom, said duct adapted to provide a water opening at a height above the water opening of the tank.

33. The system of claim 31, wherein at least a portion of the plurality of tanks are partitioned into a plurality of chambers, said chambers include chamber walls with air openings that provide free air flow between the chambers and wherein each of the chambers includes water opening through which water from surrounding environment can flow.

34. The system of claim 31, wherein at least a portion of the plurality of tanks includes walls with structural reinforcements, wherein an amount of the reinforcement provided increases over a height of the tank.

35. The system of claim 31, wherein at least one an inner or outer wall of the plurality of tanks is coated with a metal layer.

36. The system of claim 31, wherein the at least one duct communicating between the at least one opening for air flow and a source of compressed air is lined with a plurality of ribs adapted to cool the compressed air as it flows from the source to the tank.

37. The system of claim 31, comprising at least one duct communicating between the at least one opening for air flow in at least one of the plurality of tanks and a pneumatic device.

38. The system of claim 37, comprising a heat exchange unit for transferring heat generated by the source of compressed gas to air flowing from the at least one duct communicating between the at least one opening for gas flow in at least one of the plurality of tanks and a pneumatic device.

* * * * *